Sept 1, 1925.

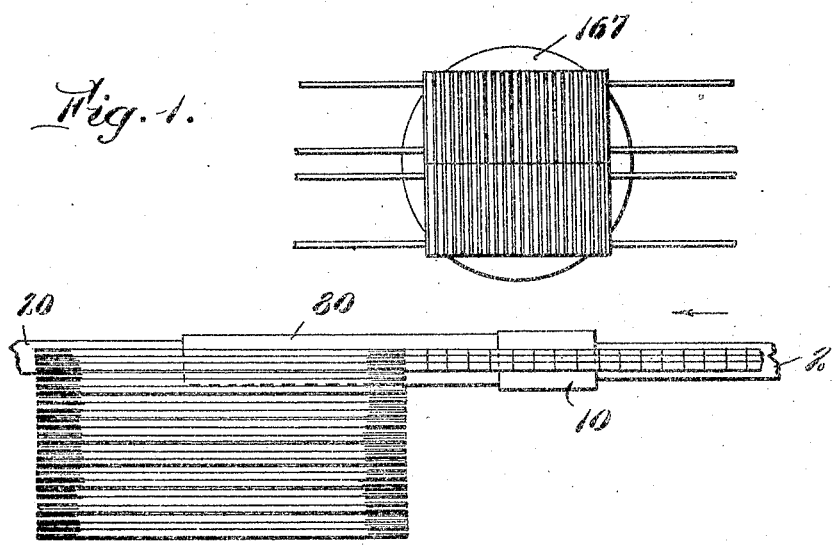
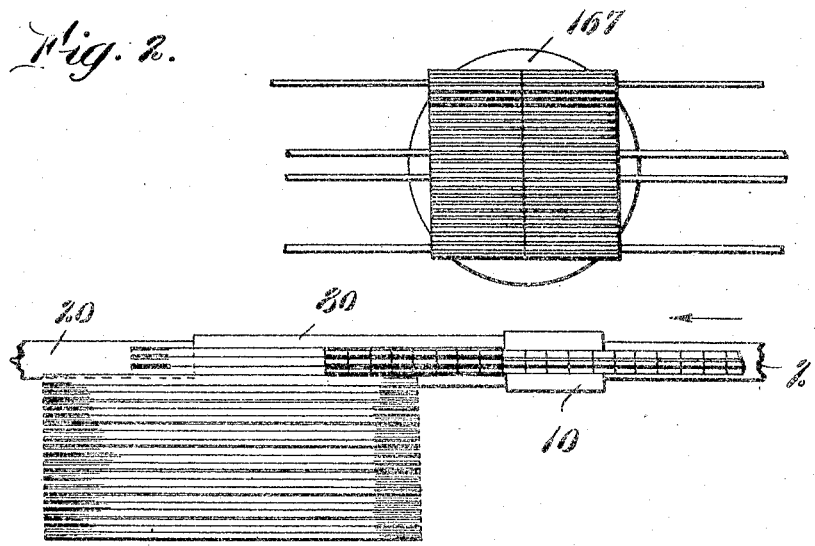

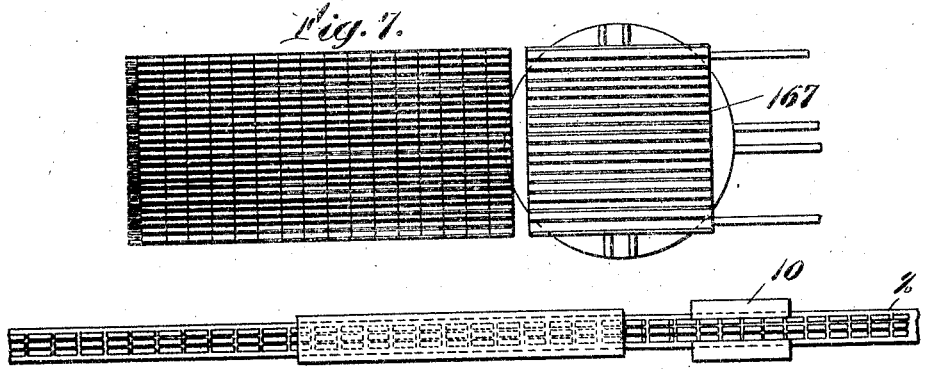
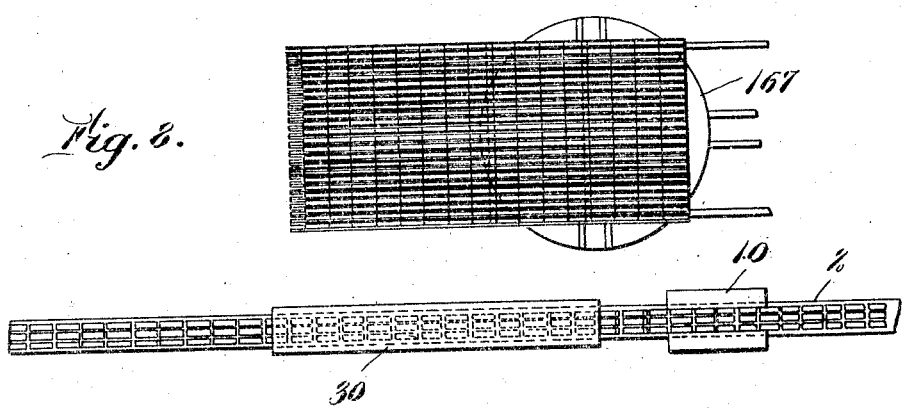
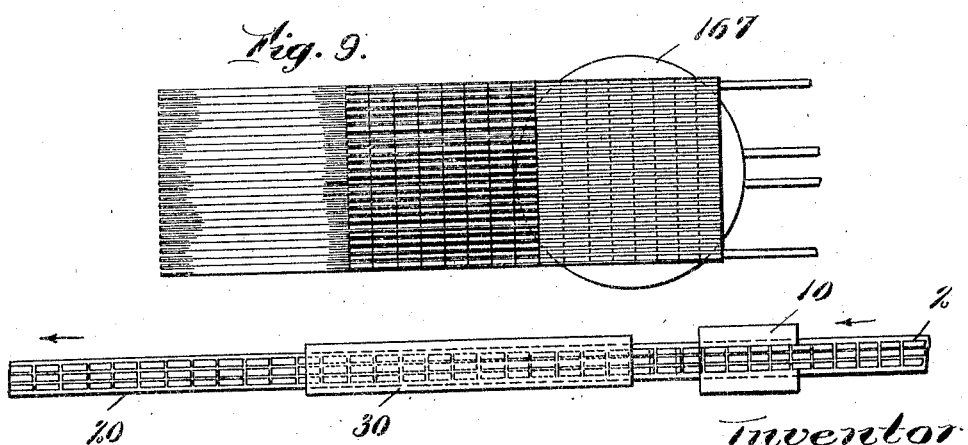

G. E. LUCE

APPARATUS FOR AUTOMATICALLY HACKING BRICK

Original Filed Dec. 14, 1918   15 Sheets-Sheet 4

1,551,890

Inventor:
Grafton E. Luce
by James R. Hodder
Atty.

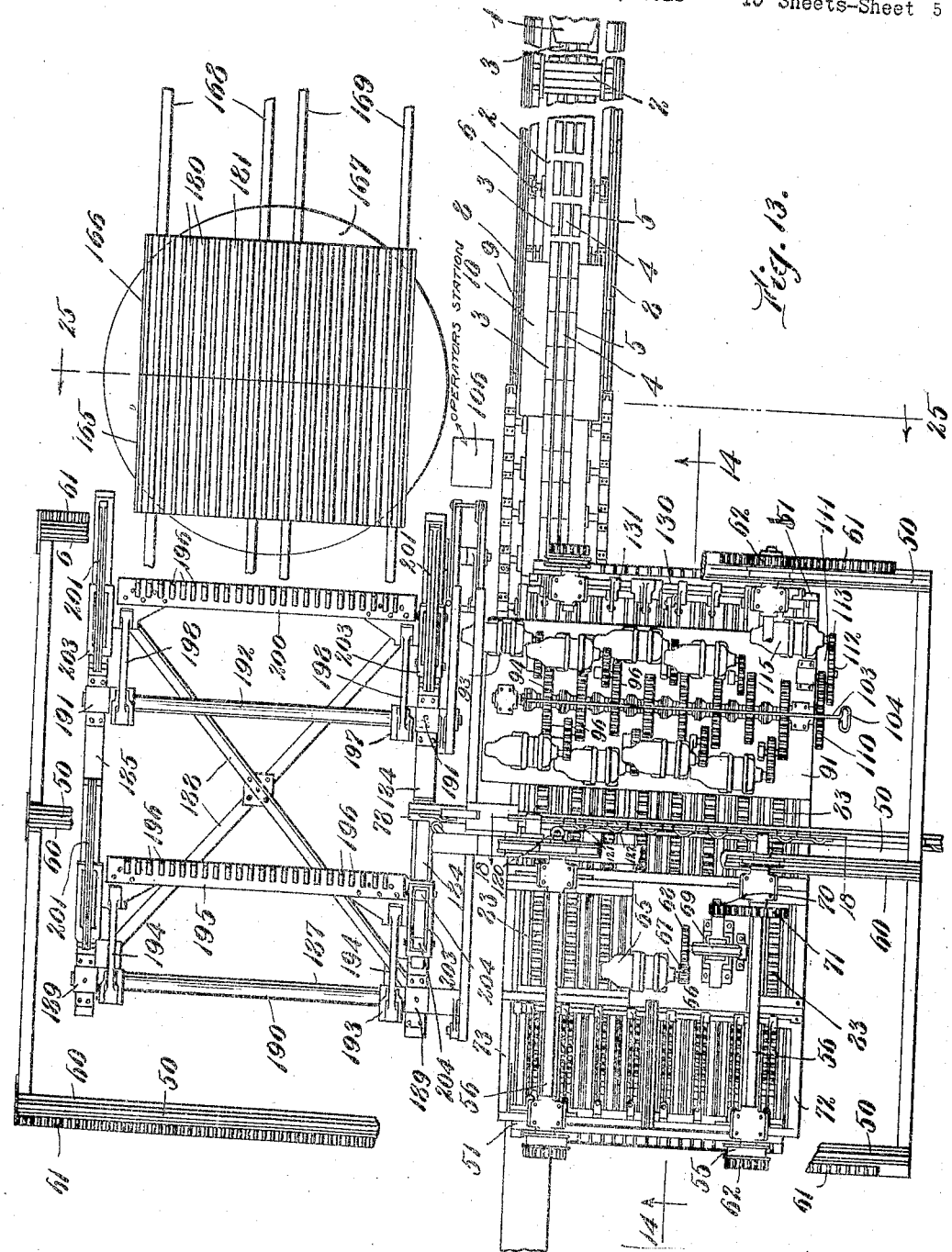

Sept. 1, 1925.
G. E. LUCE
1,551,890
APPARATUS FOR AUTOMATICALLY HACKING BRICK
Original Filed Dec. 14, 1918 15 Sheets-Sheet 6
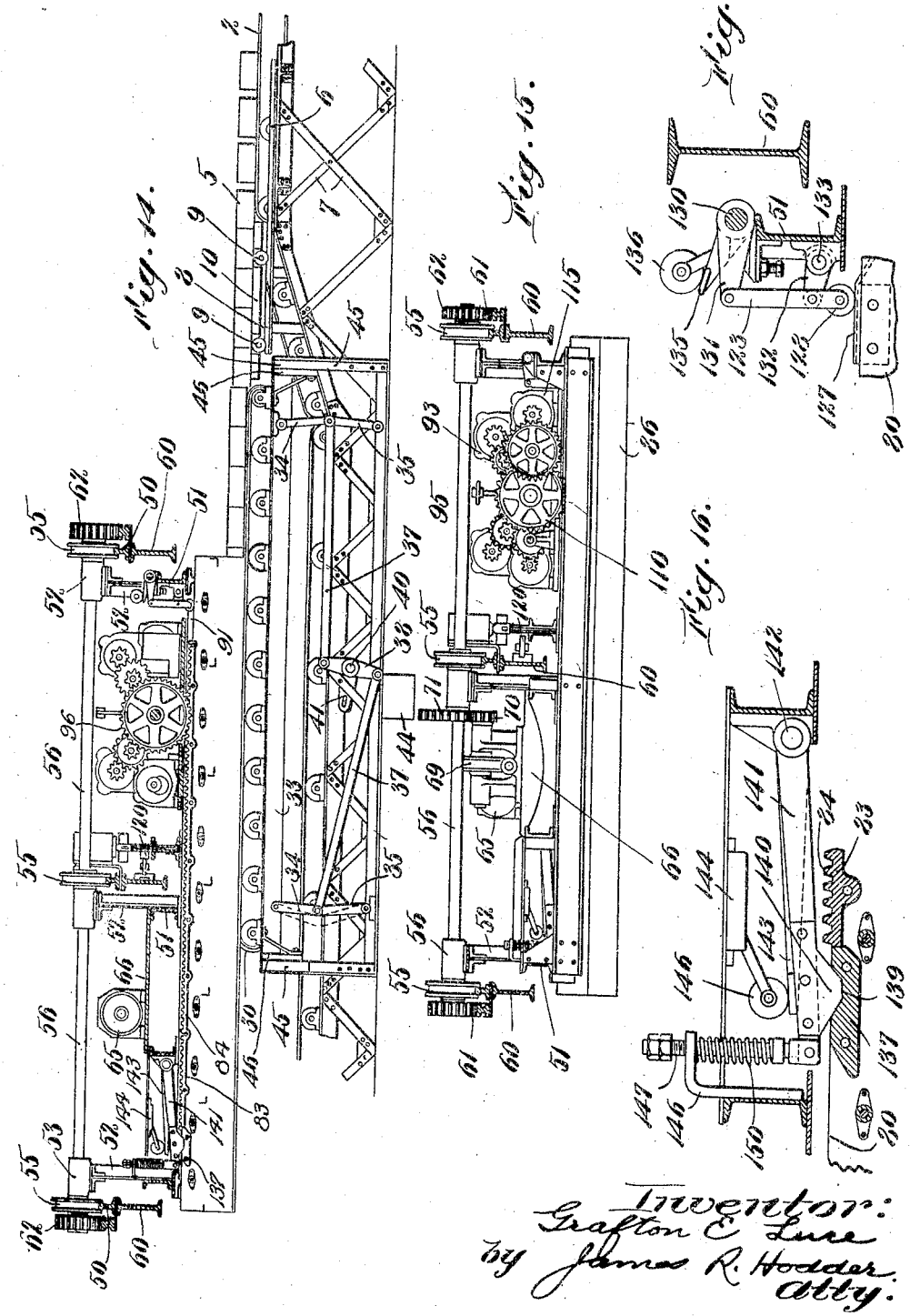

Sept. 1, 1925.
G. E. LUCE
1,551,890
APPARATUS FOR AUTOMATICALLY HACKING BRICK
Original Filed Dec. 14, 1918    15 Sheets-Sheet 7
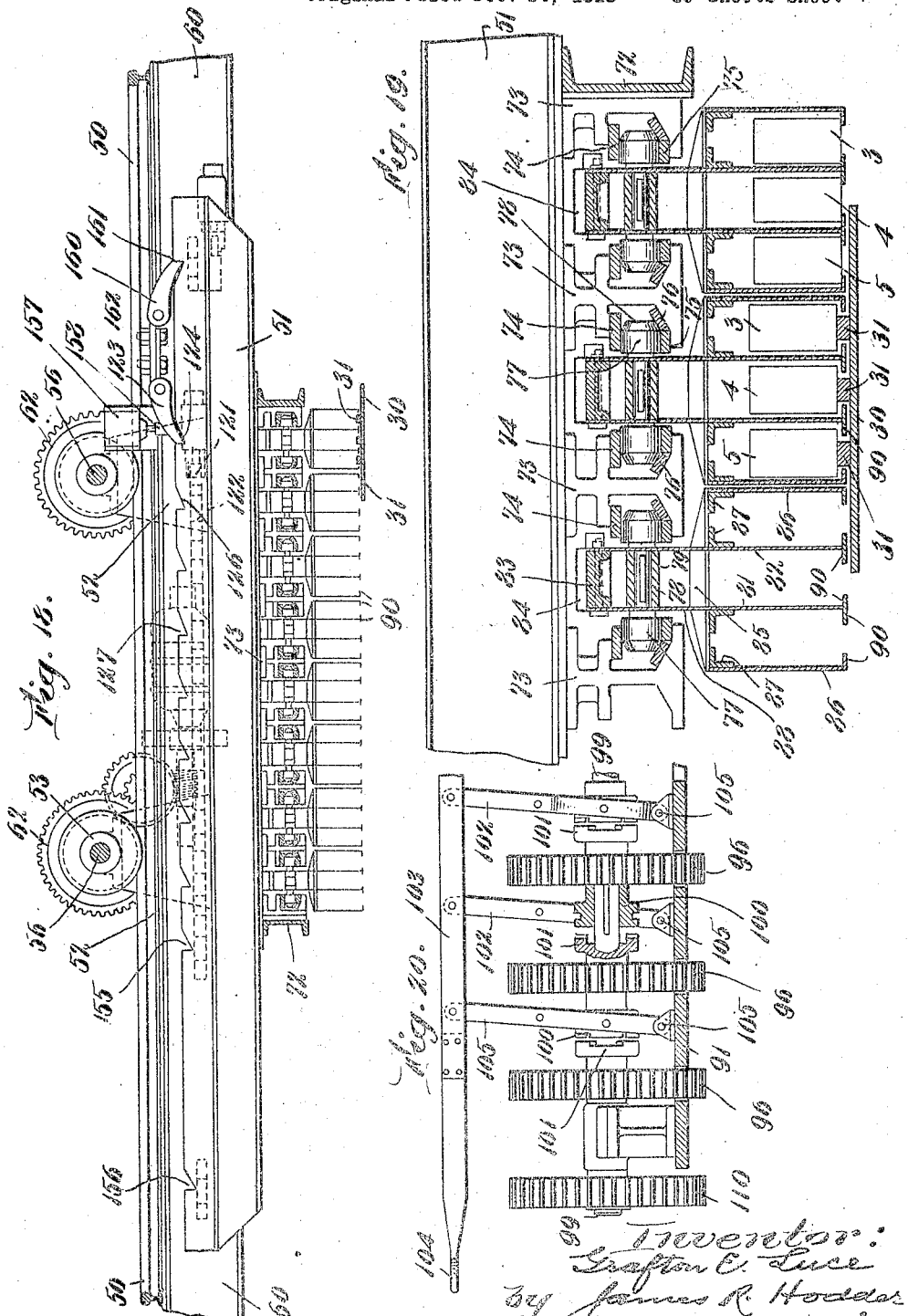

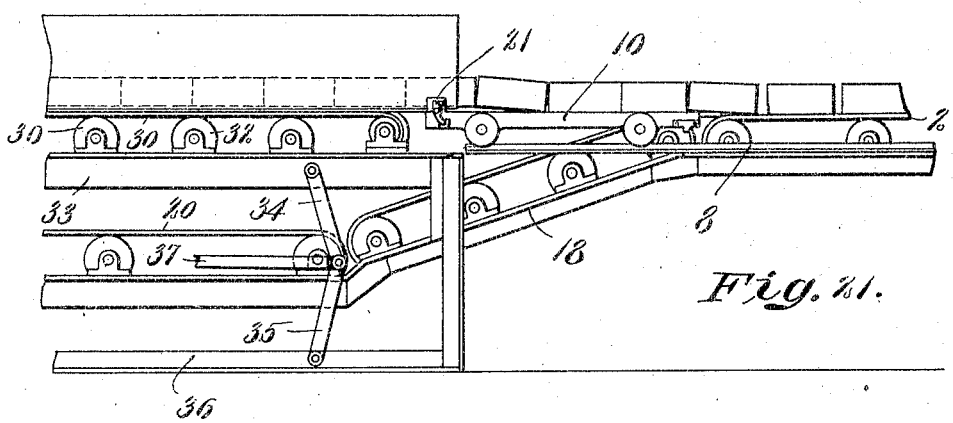
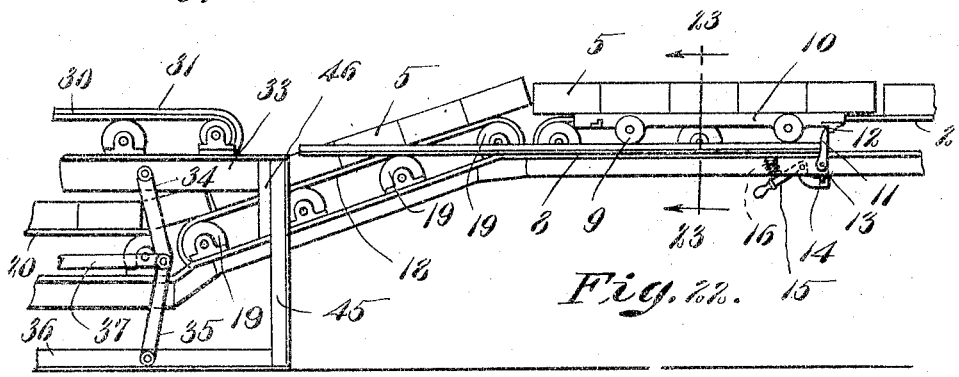
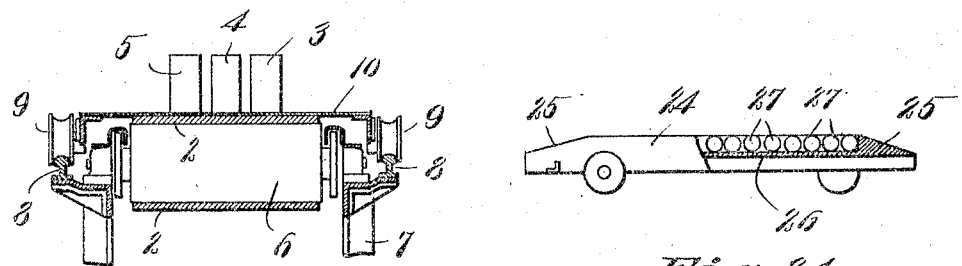

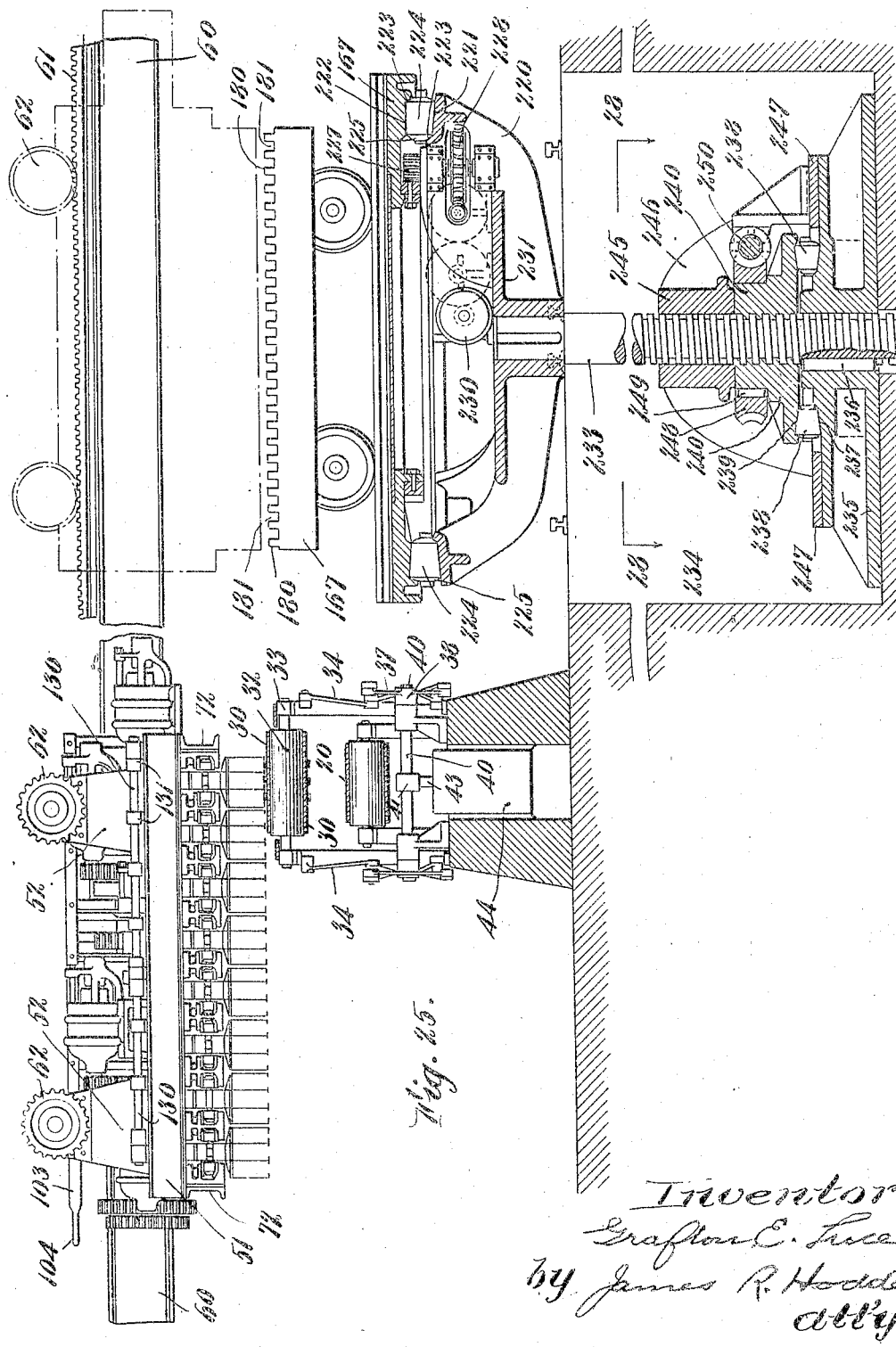

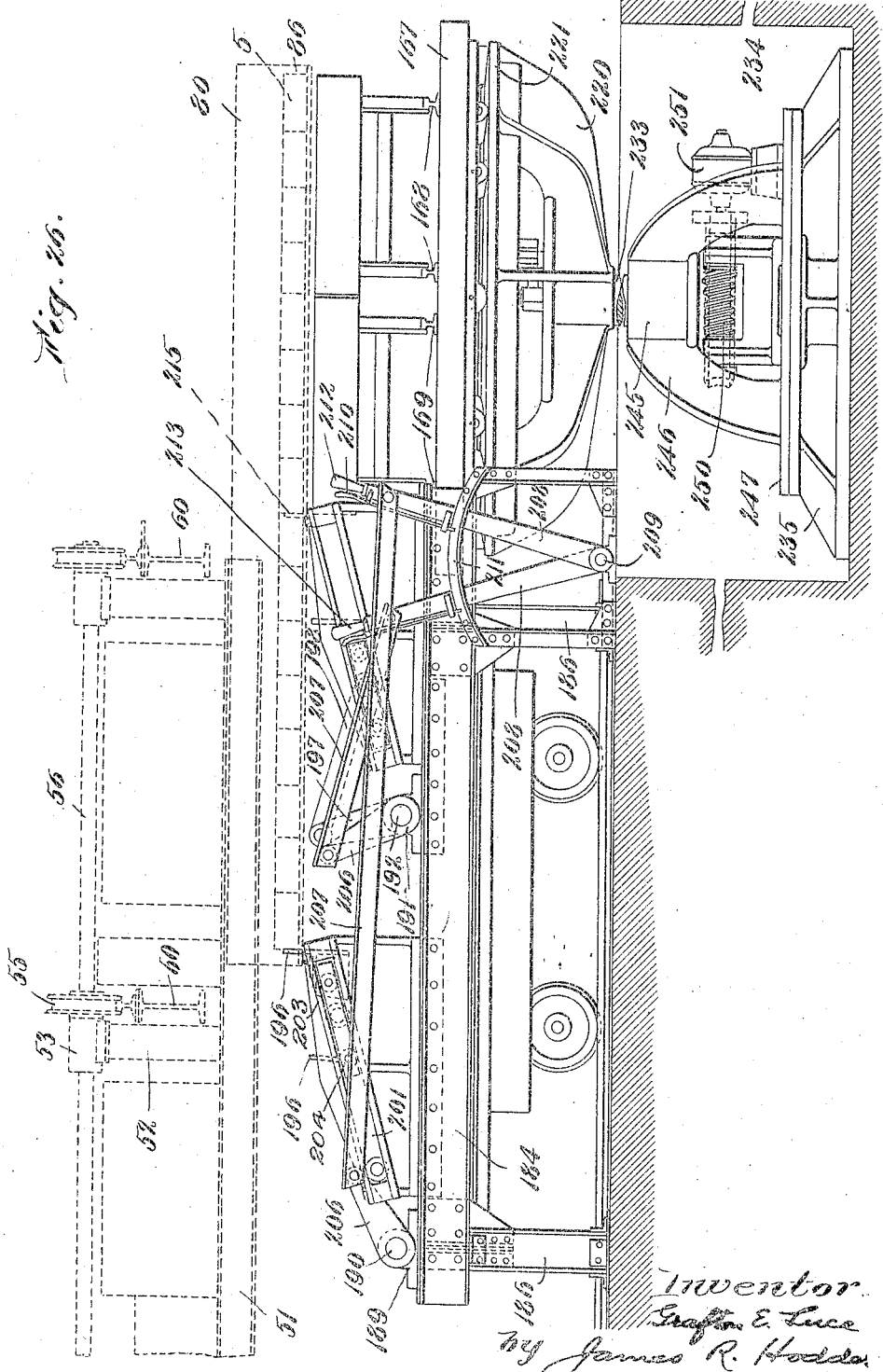

Sept. 1, 1925.
G. E. LUCE
1,551,890
APPARATUS FOR AUTOMATICALLY HACKING BRICK
Original Filed Dec. 14, 1918    15 Sheets-Sheet 11
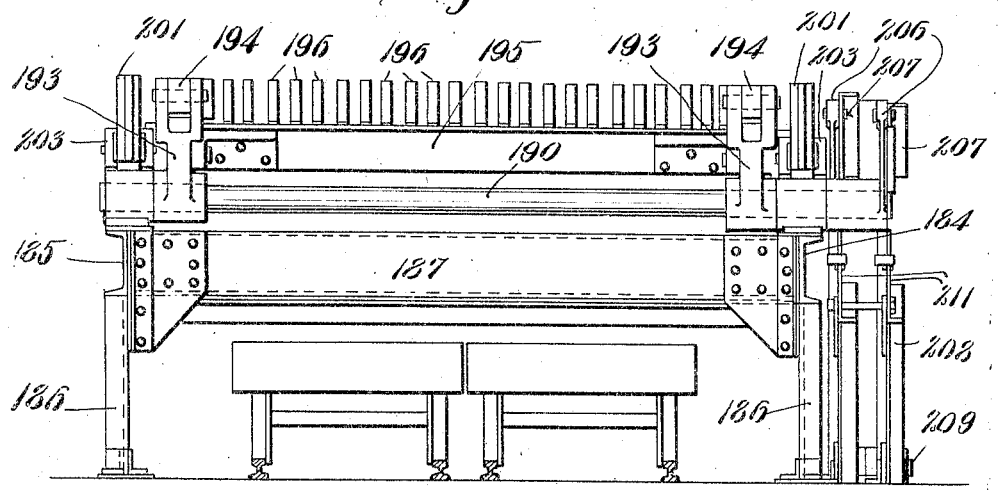
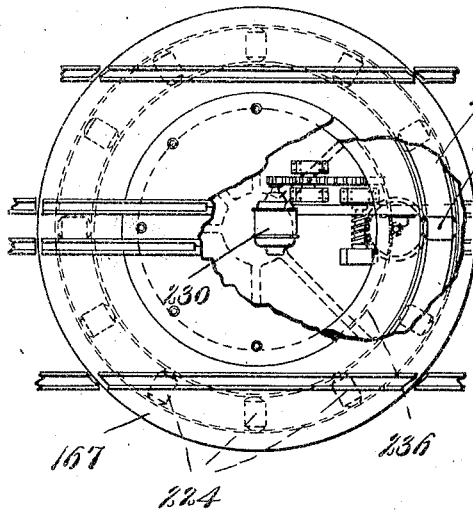 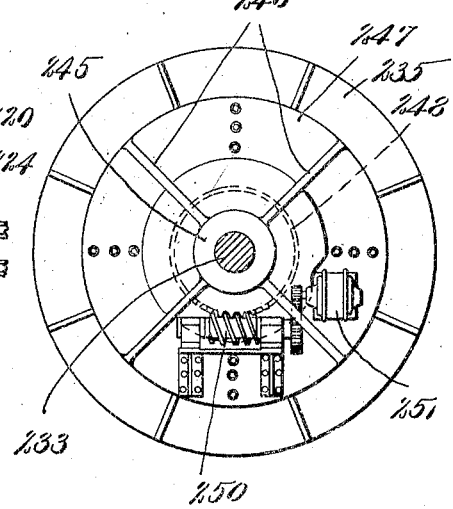
Inventor:
Grafton E. Luce
by James R. Hodder
Atty.

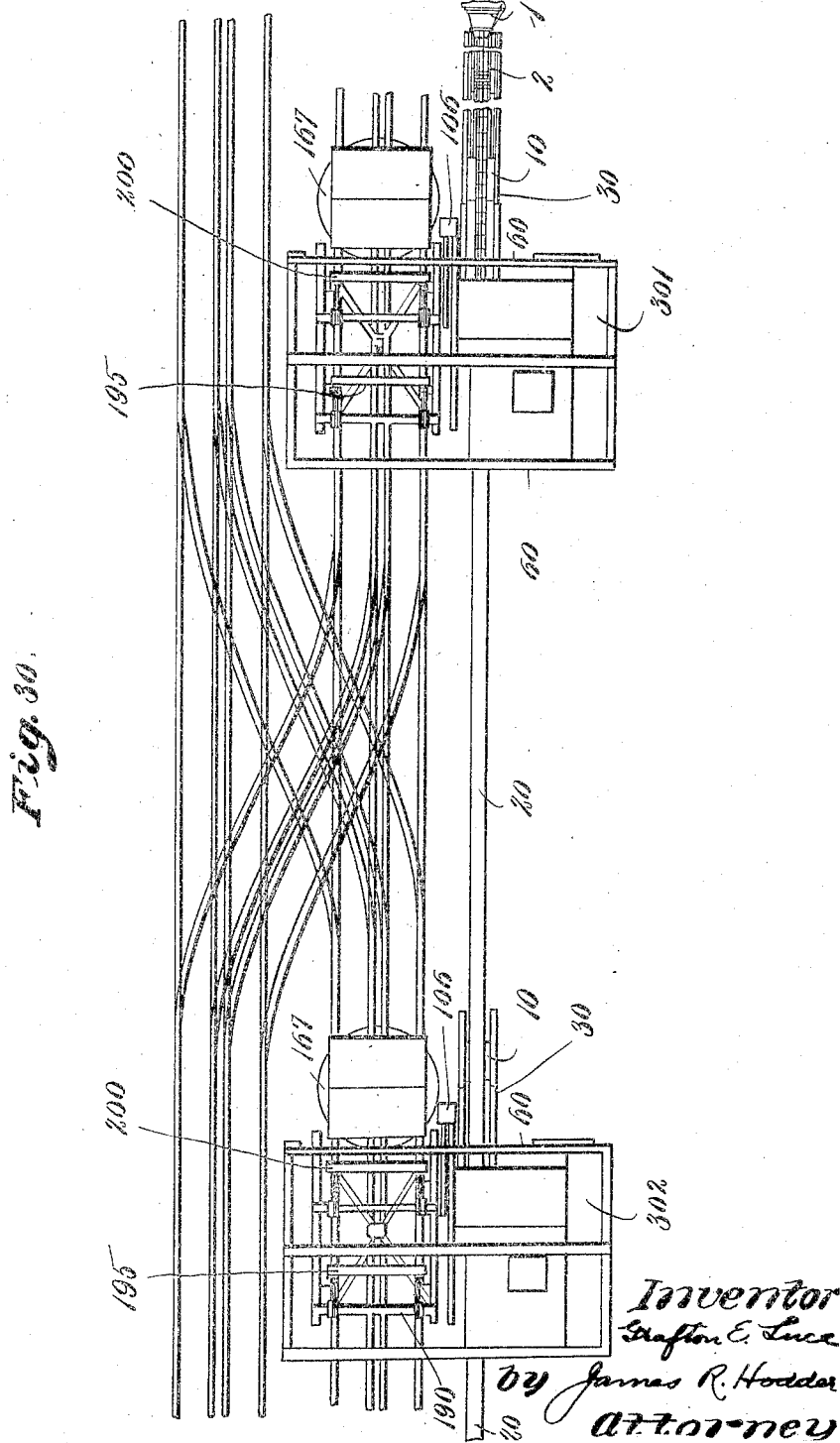

Sept. 1, 1925.
G. E. LUCE
1,551,890
APPARATUS FOR AUTOMATICALLY HACKING BRICK
Original Filed Dec. 14, 1918   15 Sheets-Sheet 13
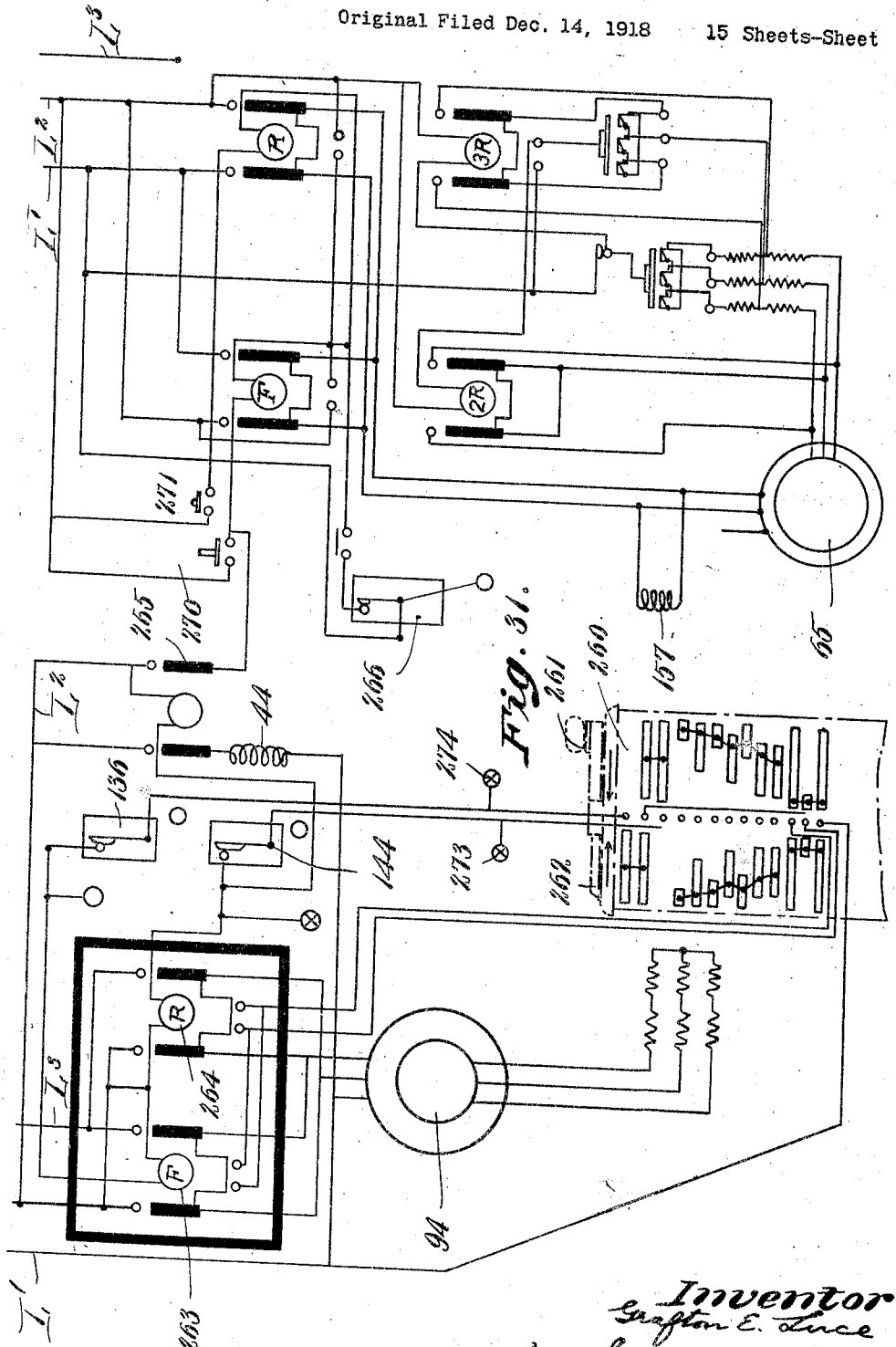

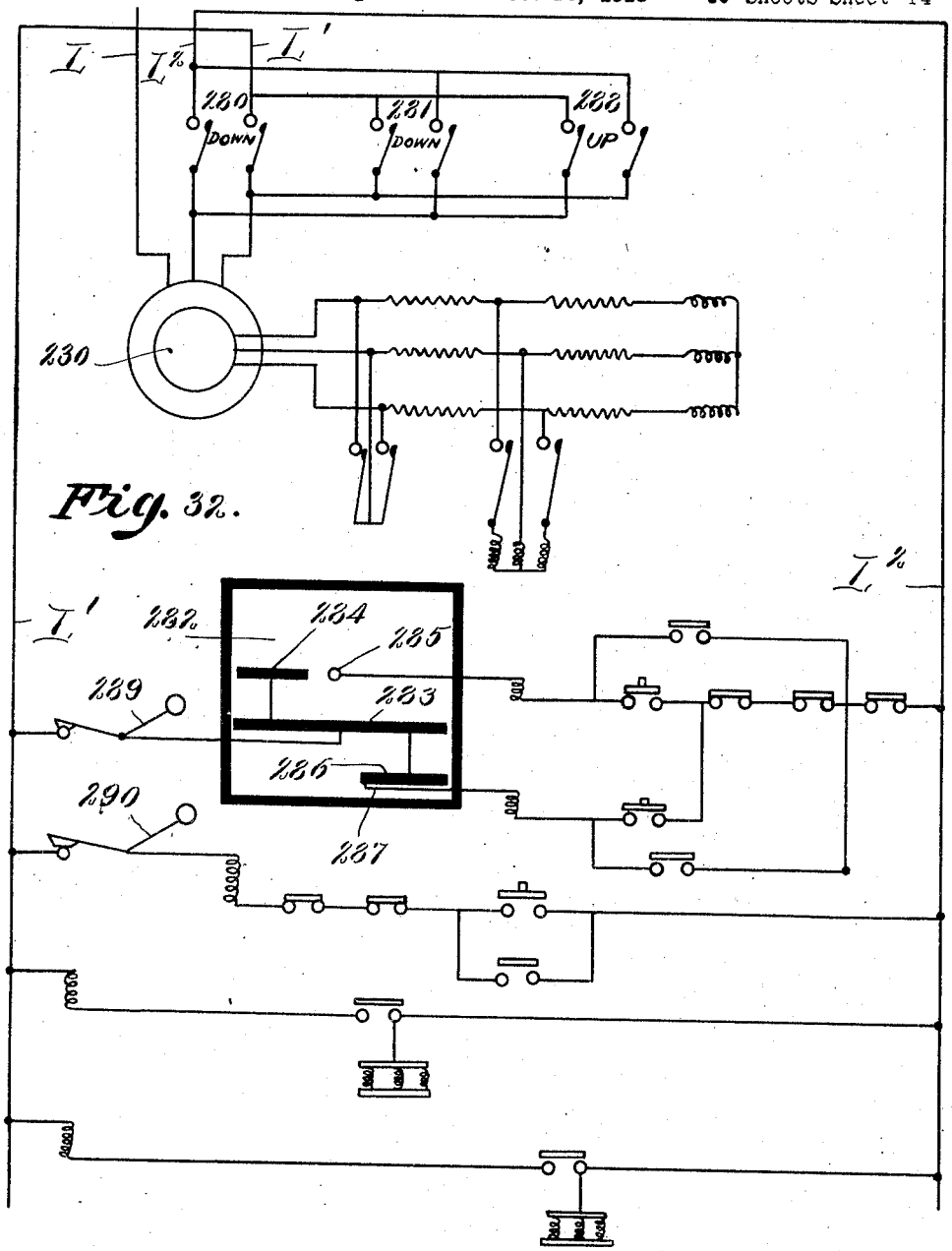

Sept. 1, 1925.

G. E. LUCE 1,551,890

APPARATUS FOR AUTOMATICALLY HACKING BRICK

Original Filed Dec. 14, 1918    15 Sheets-Sheet 15

Inventor
Grafton E. Luce
by James R. Hodder
Attorney

Patented Sept. 1, 1925.

1,551,890

UNITED STATES PATENT OFFICE.

GRAFTON E. LUCE, OF CHICAGO, ILLINOIS.

APPARATUS FOR AUTOMATICALLY HACKING BRICK.

Original application filed December 14, 1918, Serial No. 266,669. Divided and this application filed July 5, 1919. Serial No. 308,891.

*To all whom it may concern:*

Be it known that I, GRAFTON E. LUCE, a citizen of the United States, and a resident of Chicago, Illinois, whose post-office address is No. 180 North Pine Avenue, Chicago, Illinois, have invented an Improvement in Apparatus for Automatically Hacking Brick, of which the following description, in connection with the accompanying drawings, is a specification, like letters on the drawings representing like parts.

My present invention is an apparatus for use in the manufacture of brick and other clay products, constituting an automatic machine for hacking green brick directly from the off-bearing belt of a brick making machine, piling and stacking the brick in desired spaced relation for drying, setting and burning. The present machine is the preferred mechanism for carrying out the process described and claimed in my co-pending application, Serial No. 266,669, now Patent No. 1,384,303, dated July 12, 1921, on process of manufacturing and handling brick, in which said case, the apparatus herein illustrated and elected to be claimed in the present application is fully and completely shown.

In said co-pending application, Ser. No. 266,669, I have elected to claim my novel process or method directed to cover and protect my improvement in brick manufacture, as set forth in the various steps of the same, believing the process to be a distinct novelty in the art, and in the present application, I have elected to claim the apparatus, the mechanism, and various features of the same believing that the mechanisms which I have devised and developed for carrying out the invention are distinct novelties in the art of machines for use in the manufacture of clay products and I wish to claim the same and the various details and features thereof broadly. I believe it to be a distinct novelty to devise a machine which will automatically receive a column of green brick or a plurality of columns of brick or other clay articles, directly from the off-bearing belt of the machine, permitting a plurality of said brick or articles to be removed from the belt without marring, injuring, or damaging the same, and unloading said plurality of articles onto a platform, dryer car or the like, also without injury. It is, so far as I am advised, a distinct novelty in this art to automatically hack successive rows of green brick in desired spaced relation and in alternate angular positions and this capability constitutes an important feature of my present invention. A further and most important feature consists in the provision of means which will accomplish the removal of clay articles from the off-bearing belt by a movement of the carrying device in the direction contrary to that of the said off-bearing belt, thus enabling the articles to be removed from the belt in a fraction of the time which would otherwise be necessary for delivery of the clay articles at the rate of speed of the off-bearing belt alone. This latter feature enables me to utilize mechanism which will thus be positioned and arranged for picking up or removing a considerable number of clay articles from the off-bearing belt, gaining the time required to remove these articles laterally from the belt, while simultaneously positioning a succeeding clay-article-receiving carrier, so that successive numbers, units, or masses of the clay articles are removed from the off-bearing belt without interruption or without missing a single one of the articles during their continuous travel on the said belt.

Further important features of my present apparatus consist in the provision of means which will provide for the automatic spacing of adjacent rows of brick in predetermined spaced relation for the best results in hacking, and the successive operations of drying and burning; the arrangement of independently movable sections of a carrier to load one, two, or more columns of brick simultaneously and then to position adjacent thereto means for picking up the succeeding columns of articles; and then to move the entire mass thus picked up by successive independent carriers laterally to the unloading station. The unloading mechanism also constitutes an important feature and comprises means which will automatically aline the brick in each carrier as well as successive columns of brick in adjacent carriers, so that they are properly positioned in spaced and alined relation on the unloading device. I prefer to provide means which will permit the unloading from the carrier onto the dryer car, or platform, and to impart relative rotative movement between the dryer car and the carrier so as to unload successive layers in angular position—preferably at right angles—also raising or lowering the car or carrier so that successive layers or rows of brick will be readily built up onto the dryer car.

As the various operations and processes for which the apparatus, herein explained, is primarily intended for use, are fully explained in the patent granted to me July 12, 1921, No. 1,384,393, and to which reference is hereby made, and the devices incident to this invention are also therein explained.

My apparatus as herein disclosed and claimed comprises an automatic hacking machine wherein a capacity of 350,000 bricks or more in a day of eight hours can be handled, directly from the off-bearing belt of the machine, uniformly hacked, and evenly spaced and unloaded on the dryer and burning car in perfectly alined stacked formation, without injuring, marring or defacing the sides of the brick or the corners, independently of any side clamping devices and further more unloading each brick with merely the slight pressure incident to its own weight, positioning the same squarely and in a horizontal position with substantially even pressure throughout, whereby the corners and edges of the green brick are maintained intact. I believe that mechanisms for accomplishing this desirable result are broadly new and I therefore wish to claim the same herein.

Further novel features, important combinations of parts and advantages will be hereinafter more fully pointed out and claim Figs. 1 and 2 are study sheets illustrating the process and showing the relative position and time of travel of one set of fingers from starting position to extreme forward position; i. e. two seconds after starting;

Figs. 3, 4, and 5 are study sheets showing the return of the loaded fingers and side travel bringing into position the succeeding set of fingers for loading, in an additional two seconds or four seconds after starting, 48 brick being thus loaded;

Fig. 7 shows the loaded hacking apparatus moved to position in alinement with the dryer cars, four seconds after the completed loading shown in Fig. 6;

Fig. 8 illustrates the forward movement of the hacking apparatus for unloading the first eight brick in each set of fingers, during the additional four seconds;

Fig. 9 shows the unloading of the first layer and the retractive movement of the hacking apparatus depositing one half the entire load, 192 brick, with the time allowance of four seconds;

Figure 12:
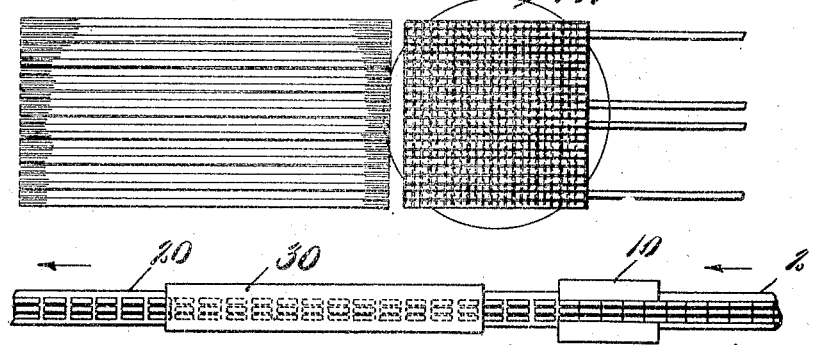

Fig. 12 shows the completing of the unloading of the second layer at right angles to the first and the entire retraction of the loading apparatus ready to return to the original position to repeat the cycle, the time interval of four seconds being required for the unloading and an additional time allowance of twelve seconds to return the hacking device to the starting position of Fig. 1, this requiring a total time for moving the hacking machine over to the drier cars, unloading it and moving it back, of thirty four seconds, a total time allowance of sixty-six seconds for completing the cycle.

Fig. 13 is a plan view, showing the hacking apparatus with a portion of the overhead supports broken away and illustrating the approximate relation of the brick making die, cutter, off-bearing belt, unloading station, drier cars, and turn table relatively with the hacking apparatus;

Fig. 14 is a side view on the line 14—14 of Fig. 13 and the shuttle plate in position for loading and in the direction of the arrows showing a portion of the off-bearing belt;

Fig. 15 is a side view of the hacking carrier;

Fig. 16 is an enlarged detail, illustrating the automatic latch for locking each group of hacking carriers in desired position on the full return motion of its loading action;

Fig. 17 is an enlarged detail of the automatic limit switch controlling the forward limit of travel of each group of hacking fingers;

Fig. 18 is an enlarged view transversely of the hacking carrier diagrammatically on the line 18 of Fig. 13;

Fig. 19 is an enlarged cross sectional (fragmentary) view showing a portion of the brick engaging fingers and carriers having the first three columns of brick loaded and illustrating the loading action on the second adjacent carrier columns of brick;

Fig. 20 is a fragmentary view illustrating the clutch and gearing connection adapted to unite all the movable groups of carriers for further simultaneous movement during unloading on the line 20 of Fig. 13;

Fig. 21 is a fragmentary view on an enlarged scale illustrating the shuttle plate by pass and adjacent parts with the shuttle plate closed in position for loading onto a hacking carrier during its loading action;

Fig. 22 is a view illustrating the shuttle plate in inoperative position and with the brick being conducted through the by pass onto the next adjacent hacking apparatus;

Fig. 23 is a cross sectional view on the line 23—23 of Fig. 22 looking in the direction of the arrows;

Fig. 24 illustrates, partly in cross section, a modified form of shuttle plate having an anti-friction surface formed with a plurality of rollers to fit tightly to the bottom of the brick;

Fig. 25 is a view in cross section transversely of the hacking carrier and illustrating the relative position of the drier car, supporting turn table, and means for rotating and lowering the turn table on the line 25—25 of Fig. 13, looking in the direction of the arrows;

Fig. 26 is a side view showing the turn table, drier car, and unloading devices looking from the right of Fig. 25 and indicating the relative position of the hacking carrier in dotted lines during unloading;

Fig. 27 is an end view of the unloading station, looking from the left of Fig. 26;

Fig. 28 is a view of the turn table partly broken away, illustrating the motor and rotating gearing;

Fig. 29 is a further detail of the turn table showing the motor and lowering and raising connections;

Fig. 30 is a plan view on a reduced scale, illustrating a plurality of automatic hacking apparatus operating in conjunction with the brick making machine and arranged to handle the entire capacity of the brick machine, each apparatus operating in conjunction with the other, one loading while the other is unloading, etc.

Figure 33:
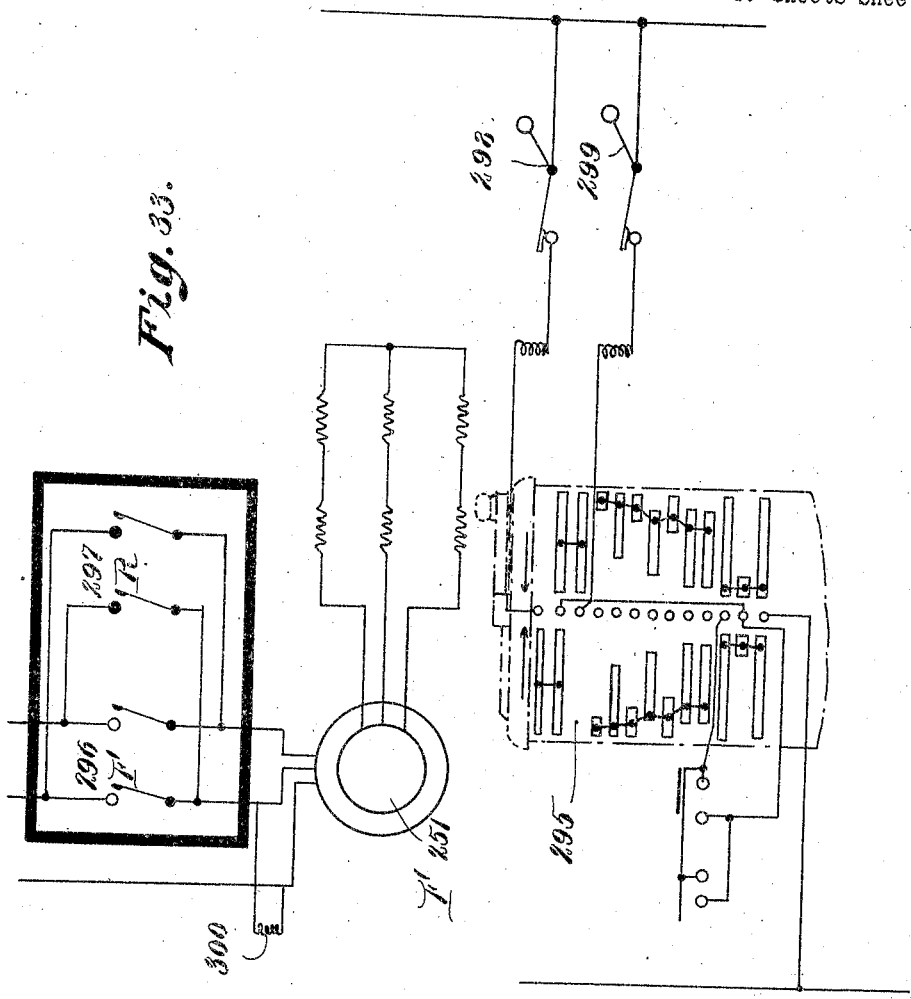
Figure 34:
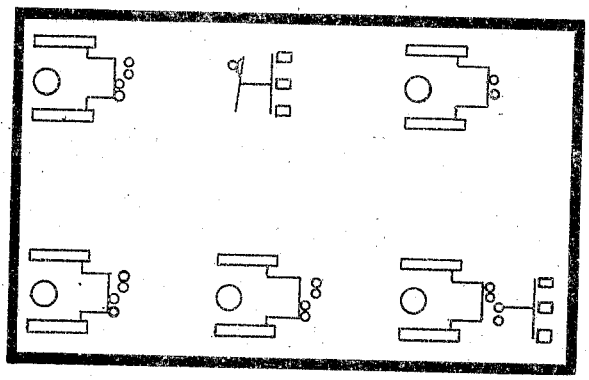

Fig. 31 illustrates in diagrammatic form the electrical wiring and controls for the series of motors 94, 95, etc. and the automatic interconnections with the motors 65 and 115;

Fig. 32 shows the controller, motor and electrical wiring connections to raise and lower the turn table;

Fig. 33 illustrates the electrical controls for the motor rotating the turn table 90 degrees between the load of each successive course of brick thereon; and Fig. 34 illustrates the switchboard.

The apparatus for carrying out my invention as above briefly outlined, will now be described. Duplicate hacking apparatus are preferably employed and a description of one will serve for each, both sets being illustrated in Fig. 30.

Referring to the drawings, I have indicated at 1 the die of any usual, suitable, or standard type of brick making machine, the brick material forced therefrom being carried forwardly on a belt 2, to and under a cutter 3, the off-bearing belt and cutter being of standard type. In carrying out my invention with the apparatus herein illustrated, I am enabled to handle three columns of brick and consequently I provide a die 1 of any suitable form to make these three columns, which are afterwards cut into individual brick. An important advantage of this handling of a plurality of three columns of brick is that the units to be set are, one over three; it will be appreciated however that any desired multiplicity of columns of brick could be automatically and simultaneously handled if desired, as well as a single column of brick. For efficiency and expediency, I find that the handling of three columns results most satisfactorily. It will also be appreciated that, while I have herein illustrated and described the columns of brick as being carried by the off-bearing belt 2 directly from a die, it is equally within the scope of the apparatus, and it is contemplated by my invention, to automatically set and hack brick from any continuous traveling apparatus or belt, whether said brick are placed thereon by hand, other carriers, machines, or directly from the brick machine die 1. With the brick either formed by the cutter 3 or placed on the belt 2, the columns 3, 4, and 5 are conveyed by the traveling belt 2, the latter of usual type running on rollers 6 and mounted on a suitable framework 7, toward the hacking devices.

In order to control the delivery of the brick columns 3, 4, and 5 either to the first hacking apparatus onwardly to the second hacking apparatus, I provide a shuttle plate which will serve to carry the brick onto the auxiliary loading belt for the hacking apparatus first to be described or to conduct the column of clay through a by pass and second carrying belt by the first hacking apparatus to the second, which shuttle plate also serves to effect this work while the first hacking apparatus is being unloaded onto the frame 7 and on each side are tracks 8, 8 on which the shuttle plate 10 is carried by flanged wheels 9, 9. This shuttle plate is a thin sheet steel plate positioned just above and preferably in contact with the upper surface of the off-bearing belt 2. Consequently the streams or columns as they are fed forwardly by the belt 2 will cause the brick to slide upon and over the shuttle plate, bunching the same by the frictional contact of the brick with the plate. This plate is preferably of polished steel as will be explained, a modified form may be used to lubricate the bottom of the brick column so that the power required to slide the columns of brick across the plate is negligible. When the shuttle plate is in operative position i. e. in forward position or at the right, as shown in Fig. 22, a latch 11 engages a catch 12 on the side of the shuttle plate holding the same in forward or inoperative position and allowing the columns of brick to be forced freely thereover. The latch 11 is mounted on a pivot 13 to which an arm 14 is secured and is held in position by the lever 15 which is normally under the tension of a coiled spring 16. A slight pressure on the handle end of the lever 15 by the operator releases the latch and consequently allows the shuttle plate to be moved forwardly on the tracks 8 by the friction and power of the on-traveling columns of clay. With the shuttle plate in retracted position the clay columns are forced thereover and are delivered onto a belt 18 which latter is inclined downwardly and is mounted on a series of rollers 19, 19, the columns of brick being thus deflected by this belt 18 to a further traveling belt 20, the latter carrying the columns of brick clear under the first hacking apparatus to the second apparatus where a similar shuttle plate may be positioned. When the latch 11 is released and the shuttle plate 10 moved forwardly by the column of brick, it will be noted that the speed of travel of this shuttle plate carrying the succeeding brick is no faster than the travel of the columns of brick down the belt 18, the latter carrying the preceding brick out of the way of the oncoming brick, supported by the plate 10. This shuttle plate moves forwardly on its tracks until it is engaged by the forward end of one of the fingers of a group of brick engaging fingers on the hacking carriers, as illustrated in Fig. 21, whereupon an automatic latch 21, holds the plate 10 in contact therewith until the completion of the delivery of a load of brick into the brick engaging fingers of the particular brick hacking carrier in position therefor. As soon as the carrier is loaded, the operator then releases the latch 21 and slides the shuttle plate 10 backwardly to inoperative position, allowing the succeeding columns of brick to be deflected down the by pass afforded by the inclined belt 18.

If desired, I may provide the shuttle plate 10 with anti-friction and lubricating means, as illustrated in Fig. 24. In this modified form, the shuttle plate 10 is a box-like form 24 with beveled ends 25, 25, to facilitate the sliding of the brick from the belt 2 thereover, the bottom portion of this plate 26 resting or being closely adjacent the top of the belt 2. Within the box-like portion 24 is mounted a plurality of rollers 27, 27, preferably being felt covered and rotating within a quantity of oil or other lubricant and contained within the box 24 and automatically feeding up the same to coat the lower faces of the brick sliding thereover. The operation of this type of shuttle plate 24 is identical with that just described for the shuttle plate 10 with an additional feature of the anti-friction and lubricating feeding rolls 27.

In order to load the hacking devices or carriers expeditiously and without injury, as well as to provide means to permit the forward loading movement of the hacking carriers, against the line of travel of the oncoming columns of brick, to gain time, secure quicker loading action, and facilitate the side or lateral movement of the loaded carrier while retracting it and simultaneously positioning the succeeding carrier, I have provided a novel type of loading device. This comprises an endless belt 30 positioned in alinement with the off-bearing belt 2 and with the shuttle plate 10, this belt having on its outer or brick engaging face, riblike members 31. Where three columns of brick are to be handled, I provide three such riblike portions 31 in position and alinement to receive and carry the brick fed thereto by the shuttle plate 10 when the latter is in a carrying or operative position to carry the brick to the hacking carrier. These ribs are arranged to support the brick substantially centrally and to give a broad bearing surface so as not to injure the green, plastic brick delivered thereto and carried thereby into the loading fingers of the hacking carrier. This auxiliary belt 30 is preferably of suitable length for loading the hacking carrier, as previously explained. I have adopted the unit of sixteen brick in length and three columns of said brick as the most efficient for handling and hacking. The auxiliary belt 30 also is mounted on a plurality of rollers 32, 32 at convenient distances to support the same and to hold the belt taut, said rollers being carried by the framework 33 which is moved upwardly and downwardly by the set of toggle links 34, 34, 35, 35, at each side and at each end respectively of the frame 33 carrying the auxiliary belt 30 (see Figs. 14 and 25). These toggles are pivoted to the frame 33 and the lower links 35 to a fixed part of the lower beams or frame 36 and are simultaneously operated by connecting rods 37, 37 pivoted centrally to each pair of links and with the other ends of said rods 37 pivotally secured to a yoke 38 mounted on a shaft 40 to which shaft is secured an arm 41. Oscillation of the yoke 38 thus acts to raise or lower the frame 33 and consequently to raise or lower the surface of the belt 30 and the riblike members 31 into the loading carrier; in order to automatically control this raising and lowering of the auxiliary belt, I provide a solenoid 44 which has a piston 43 attached to the arm 41 and I control the actuation of this solenoid diametrically by the current moving the hacking fingers being loaded during their forward line of travel. Energizing the solenoid 44 acts to move the arm 41 and to straighten the toggles 34 and 35 at each side and each end of the auxiliary belt carrying frame 33, thus to raise and hold the belt during the continuous travel of the same, thereby lifting the riblike members a sufficient height above the brick engaging fingers of each hacking carrier so as to transport and carry the brick columns into the carrier free of contact between the brick and the carrier, as clearly illustrated in Fig. 19 and as will be explained further. The solenoid acts to hold the belt 30 in raised position as the carriers are moved forwardly whereupon the current is automatically cut off from the solenoid 44 and the frame 33, auxiliary belt 30 and the movable parts fall by their own weight downwardly and below the level of the hacking carriers permitting the same to move laterally free of the riblike strips 31. In order to hold the movable frame 33 in vertical alinement during its raising and lowering action, I have supplied an angle iron 45 adjacent each corner, said frame being attached to the rigid base 36 and on the respectively adjacent ends of the frame 30 are sliding guides 46. These guides and the adjacent standard 45 are also maintained in sliding contact, thus holding the frame and consequently the auxiliary belt in predetermined alinement and vertical position.

The hacking machine comprises a framework swung from a set of tracks 50, 50 arranged at right angles to the line of travel of the belts just described and from which the hacking carriers and brick engaging fingers are supported. This supporting frame for the hacking machine consists in a plurality of beams 51 carried by hangers 52, 52 extending upwardly to journaled bearings 53 for flanged wheels 55, 55. These wheels may be suitably spaced and I have here shown a set of these wheels, two on each of the tracks 50 and each set of three wheels being in alinement and connected by a rigid axle 56, 56. The tracks 50 are carried by rigid beams 60 extending a suitable distance to carry the entire hacking machine transversely out of the line of travel of the loading belts and into desired position for the unloading. Preferably the unloading station is arranged in immediate proximity with the traveling belts, substantially as illustrated in relative arrangement in Fig. 13. This unloading station could, however, be positioned at any convenient point and if desired the entire hacking apparatus could be moved on its rollers 55 and the supporting rails therefore, a suitable distance. In order to move the hacking machine rollers, 55, I provide a pair of racks 61, 61, supported by each of the outer beams 60 and I attach to the outer ends of one of the shafts 56 carrying the wheels, gear wheels 62, 62, and arranged to rotate this shaft 56 by a motor 65 supported on a platform 66 rotating the shaft 56 through the gears 67, 68, worm 69, pinion 70, and gear 71, the latter keyed to the shaft 56. Rotation of this motor 65 therefore serves to move the entire hacking apparatus transversely. I arrange to actuate this motor 65 and therefore to move the hacking apparatus intermittently to bring successive hacking carriers into brick receiving position during loading, these progressive steps being automatically stopped from time to time to bring the hacking carriers into successive positions, then to continue the transverse movement of the entire loaded hacking apparatus to the unloading station—also to return the unloaded apparatus into position to repeat the cycle.

The beams 51 are united by cross frames 72 and 73 and such braces as may be desired and on the beams 51 are supported a plurality of brackets, constituting runways for the sets or groups of hacking carriers. As shown in Fig. 19, these tracks 73, 73, 73, are suitably formed to receive steel plates or tracks 74, 74, and 75 together with an inclined end thrust track 76 to co-operate with a roll or wheel 77 having a beveled end 78 bearing against the inclined end thrust track 76 on the bracket. These tracks extend the entire length of the hacking apparatus from one outer supporting beam 51 to the other. It is desirable to have both the upper and lower bearing for these rolls 71 because when the hacking carriers supported by these rolls are moved fowardly to pick up a load of brick, the rearmost set of rolls will bear against the upper tracks 74. Each pair of rolls 77 are united by an axle 78 passing through a hub 79 and supporting thereon the hacking carrier designated generally at 80. This hacking carrier comprises two vertically extending rigid plates 81 and 82 secured to the hub 79 and also to the rackbar 83, having teeth 84 therein. The plates 81 and 82 are appropriately spaced to receive between them the middle column of brick 4 and a plurality of suitable cross braces 85, 85 strengthening and spacing the plates 81 and 82 and carrying at their outer edges depending plates 86, 86, 86, angle irons 87, 87 still further serving to strengthen the same and hold them rigid. These plates are of thin steel or iron and of sufficient length to pick up a unit of sixteen brick, said plates being arranged in groups of four for each hacking carrier 80, as just described, and are provided with these flat brick engaging fingers 90 in the form of flanges on the bottom of each plate 81, 82, and 86, 86. Preferably these flanges 90 are of considerably less thickness than the height of the brick carrying ribs 31 on the belt 30 (see Fig. 19) so that as said belt carries the columns of brick into the carriers 80, the brick will be held upon the flanges 90.

In the loading operation of my apparatus, I position the entire hacking apparatus with one of the sets of carriers 80 in alinement with the loading or auxiliary belt 30 and then move this alined carrier forwardly allowing it to travel on its pair of rolls 77 against the line of travel of the brick columns and of the belts until a complete load of brick, i. e. sixteen in number have been moved into the carriers by the movement of the carriers, whereupon the hacking carrier thus loaded is retracted and simultaneously the auxiliary belt 30 is depressed, allowing the sixteen brick on each column, i. e. forty eight in all, to be released from the ribs 31 and to rest upon the flanges 90, thus transferring the brick from the auxiliary belt to the carriers 80 without danger of damaging the corners, marring the brick, or even touching the sides. Meanwhile the brick, having traveled a considerable distance from the die, are partially dried and set and are not liable to further damage. To actuate each carrier 80 forwardly, I provide a gear wheel which is at all time in mesh with the teeth 84 on the top rackbar 83 of each carrier 80. As shown in Fig. 13, these motors are supported on a platform 91, each motor being geared through a pinion and suitable reducing gears to a gear wheel 96 mounted to be always in engagement with the teeth of this rackbar 83. As I have arranged eight carriers 80, each carrier has a corresponding motor, therefore eight motors are provided on the platform 91. As the operation of each of these motors is identical I will letter and describe two successive motors. The motor 93 is positioned with suitable pinion and reduction gearing to drive the gear 94 in mesh with the rack 83 of the first hacking carrier. The next motor 95 is similarly arranged to drive the gear 96 of the second carrier. These two gears are similar to those indicated at 96, 96, 96 in Fig. 20, being the remaining gears on the platform and all are mounted in alinement on suitable bearings, a central supporting shaft 99 extending therethrough with each gear wheel rotating freely thereon, but adapted to be clutched to the shaft 99 by clutches 100 engaging hubs 101 on each gear wheel. Each of these clutches is operated by an arm 102 extending upwardly and being pivoted to a rod 103 having a handle 104 at the extreme outer end, the lower ends of each clutch arm 102 being pivoted to the platform 91 at 105. Consequently all the gear wheels actuating the rackbars on the carriers 80 can thus be simultaneously connected at a single pull of the handle 104 after the carriers are all loaded. I arrange the motors for successive action, the operator standing at 106 (see Fig. 13) with suitable controls, so that he can follow the columns of clay during their varying speed. Turning on the current for the motor 93 with the apparatus positioned for the loading of the first carrier 80 and the beginning of the cycle, the operator having released the shuttle 10, this motor rotates in appropriate direction to move the carrier 80 forwardly with the flanges 90 just clear of the top of the auxiliary belt 30 and between the rods 31, as current is supplied to the motor 93, the solenoid 44 is simultaneously energized and the frame carrying the auxiliary belt is moved upwardly by the action of the toggles and held in position during the continued forward movement by the operator at 106 holding the carrier in alinement or following the speed of the oncoming columns of brick, as desired, until forty eight brick or sixteen brick on each rib 31 are carried into the corresponding lifting channels of the carrier 80, whereupon he reverses the direction of travel of the motor 93, which reversal simultaneously releases the yoke 44 allowing the belt 30 to drop and then unloading the column of brick from the ribs 31 onto the flanges 90 of the carrying fingers. Simultaneously also the motor 65 is energized to rotate the shaft 56 carrying the gear wheels 62 and thereby to move the entire apparatus transversely while the carrier 80 just loaded is being retracted at a speed equal to or greater than the oncoming movement of the succeeding unloaded columns of brick. This forward movement of the brick loading devices or carrier 80 thus securing the loading action in greatly reduced time while simultaneously gaining a forward position of advantage from whence to retract the now loaded carrier and thereby secure ample time in which to move the entire apparatus sideways or transversely and to reposition the next carrier 80 in alinement with the columns of brick, is of great importance. I control this sideways travel of the apparatus and actuation of the motor 65 by automatic limit switches, to be described, stopping the transverse travel of the apparatus in exact alinement with and positioned for the next loading action of the adjacent carrier 80. Thereupon the motor 95 is rotated to move its gear wheel 96 and to move the second carrier forwardly and backwardly. I have designated the remaining gear wheels 96 as the further actuation of the successive motors is in exact duplication to that already described. Each carrier 80 is thus moved individually by its motor, its respective gear 94 on the first motor or 96 on each of the succeeding carriers being always in mesh with the corresponding rackbar of the carrier to be moved, either forwardly or backwardly, and each gear is in position to be automatically and simultaneously clutched to the shaft 99 so that all the carriers 80 may be simultaneously moved forwardly and rearwardly during the unloading action. For this purpose I have keyed to the shaft 99 a gear 110 adapted to be rotated by a train of pinions and gears 111, 112, and 113 connected with the motor 115 also mounted on the platform 91 and employed during the unloading action to move all the carriers 80 in unison, as will be explained.

In order to control and aline the movement of the apparatus transversely of the brick column when being moved by the motor 65 during the successive loading of the carriers 80, I secure to one of the hangers an automatic limit switch 120 (see Figs. 13 and 14). On the adjacent crossbar 60 is secured a series of stops 121, 122, etc., one stop being provided for the width of each carrier 80. This controls the rotation of the motor 65 and the transverse travel of the apparatus and in co-operation with the pawls 123 mounted on the beam 60 (see Fig. 18) adapted to engage recesses 124, 125, 126, etc. on the carrier beam 51 serves to stop the motor when the apparatus has traveled transversely to move the loaded carrier out of alinement and to bring the loaded carrier into alinement, de-energizing the motor 65 and holding the apparatus firmly in locked position by the engagement of the pawl 123. When the succeeding carrier 80 has been moved forwardly to pick up its load of forty eight brick, the motor 65 is again actuated to move the apparatus transversely and is again stopped by the limit switch 115 contacting with the next stop 122 and the pawl 123 locks the apparatus in alinement by contact with the succeeding recess 126.

Automatic limit switches are also applied to each carrier 80, stopping the forward travel of the carrier automatically before it has been allowed to run too far in case the operator does not, before said stop acts, reverse the travel of the motor to retrace the loaded carrier. As shown in Fig. 17, a limit switch for the forward line of travel of each carrier is mounted on one outer cross beam 51. On each carrier 80 is secured an inclined cam surface 127 near the rear end of the carrier. Arranged in the line of contact of each of these cam surfaces 127 is a cam roller 128 carried by a rod 129 and united to a common rock arm shaft 130 through a lever 131. A lower pivoted lever 132 is also secured to the beam 51 at 133 and pivoted to the rod 129 so as to hold the roller 128 in position and permit its vertical movement. Secured to the rock shaft 130 is a limit switch roll 136 which switch is in series with each of the individual motors moving the carriers 80 forwardly and backwardly.

In Fig. 16, I have illustrated a preferred form of limit switch and lock for the rearward limit of movement of each carrier 80. This includes a cam plate 137 secured to the carrier 80 near the end of the rackbar 83 having a notch 139 therein and adapted to receive a prong 140 of a switch arm lever 141 secured to a common shaft 142 and to which each arm 141 is keyed. Consequently the return of each carrier 80 to its final and normal position after it has been loaded will lift each arm 140 and rock shaft 142. Secured also to the shaft 142 is a switch lever arm 143 arranged to operate a limit switch 144 by contact of said arm with a roll 145 of the switch. This limit switch is in series with each of the motors moving the carrier backwardly and consequently when an carrier reaches its rearward movement the limit switch will be actuated and the motor stopped. To insure the locking movement, I provide a bracket 146 carrying a threaded rod 147 in alinement with the outer end of an arm 141, a coiled spring 150 encircling the rod 147 and serving to force the arm downwardly, locking the prong 140 and the cam plate 137, holding each carrier 80 thus rigidly in alinement with the rest of the apparatus. Preferably I form the rest 139 under the cam plate 137 and the locking prong 140 with co-operating beveled faces and the tension of the spring 150 serves to forcibly seat the prong and cam, thus alining each rack and consequently the teeth in the rack and the teeth of the respective driving gears 94, 96, etc. in exact position.

With all the carriers 80 loaded each with forty eight brick, the apparatus is adapted to pick, carry, and unload a total of three hundred eighty four brick, having automatically taken up these brick from the auxiliary belt in thirty two seconds and meanwhile having moved the entire apparatus step by step toward the unloading station so that but a short further movement of travel by the motor 65 is required to completely transfer the loaded carrier into position for unloading.

As shown in Fig. 18, the apparatus will be moved progressively toward the unloading station until all the carriers have received their respective loads of bricks and the pawl 123 will be in the notch 155 and only a further transverse movement is required a distance, substantially as shown in Fig. 18, from the notch 155 to the notch 156, whereupon the loaded carrier has reached the loading station, the operator meanwhile having moved the shuttle plate 10 backwardly as soon as the last carrier has received its load of forty eight brick and allowed the continuous columns of brick to proceed onward to the succeeding apparatus.

In order to operate the pawl 123 during the step by step movements, as explained, I provide a solenoid 157 with an arm 158 arranged to engage and lift the pawl 123 from time to time during the step by step movements of the apparatus laterally, the means for operating and controlling same being automatically operated, as will be explained later in describing the motors, controls, etc. Arranged adjacent to the pawl 123 is a second pawl 160 pivoted to operate in the reverse direction and to engage a notch 161 on the beam 51 which pawl and notch will be engaged on the return movement of the hacking apparatus to initial position, holding the carrier and locking it in alinement for the operation of loading the first carrier 80. This pawl simply drags across the rest of the beam without engaging any of the notches, being operable by its own weight. Both these pawls 123 and 160 are pivoted to a plate 162 in operative position, which plate is secured to the fixed beam 60.

The unloading station may be positioned, as above explained, at any desirable point, but preferably as closely adjacent to the line of the belt as is practicable and in convenient position for the operator standing at 106 to operate the unloading stops, turn table carrying the drier cars, motors, controls, etc. The beam 60 and tracks 50, as already explained, extend transversely in order to enable the hacking apparatus to be moved laterally a sufficient distance to aline the carriers 80 with the drier cars 165 and 166 which have been run onto the turn table 167, the pairs of tracks 168 and 169 loading onto the turn table and carrying the cars thereon, after which they are locked in position and the turn table rotated through ninety degrees to bring the decks of each car with the ribs 180, 180 and corresponding grooves 181, 181 in alinement. I prefer to employ the present standard size of drier car and in order to make a substantially square car deck for the unloading operations, I position two cars side by side with the respective ribs and grooves in alinement, thus rotating the turn table, as above noted, so that the ribs 180 on each car are in correct alinement and also in alinement with the columns of brick in the loading carriers. The fingers on each carrier are therefore positioned to aline with and slide in the grooves 181, when the carriers 80 are all moved forwardly by the operation of the motor 115, in position to release the columns of brick carried thereby, by setting and resting them upon the ribs 180. These ribs thus afford a broad, firm and central bearing for the lower course of brick. In order to provide suitable clearance, I have the turn table lowered so that the car deck or top of the ribs 180 will be approximately from one half to one inch below the carriers 80. This slight distance allows the brick to settle down upon the ribs, being thus supported centrally with a firm bearing surface in much the same manner that the green brick were sustained on the ribs 31 of the auxiliary belt 30. Therefore with a hacking apparatus positioned in alinement with the cars, as shown in Fig. 7 of the study sheets, the motor 115 is operated and thereby rotating the shaft 99 simultaneously and uniformly moves each carrier 80 forwardly through the engagement of the respective gears 96 on the shaft 99 with the corresponding rackbars 83 of each carrier. The motor 115 is de-energized by the action of the limit switch 136 with the carriers in the forward position, shown in Fig. 26 and having the columns of brick in each carrier positioned with the first eight brick over the two cars, each drier car being four brick wide, when the bricks are arranged end to end, as usually. In this position the brick are ready for unloading and to accomplish the unloading operation, I provide an unloading device having a series of fingers or stops adapted to engage the rearmost brick in each column of each carrier entering between the flanges 90 of each carrier and holding the brick while the motor 115 is reversed and all the hacking carriers are driven backwardly thereby depositing the first eight brick on the drier cars. The turn table 167 is then rotated through ninety degrees and lowered four inches,—the height of the brick and the carriers 80 are then again moved forwardly and this time the second unloading stops are actuated to hold the last eight brick in each carrier—which have now been moved from rearward to forward position through the retraction of the carriers while the unloading of the first eight brick has taken place and therefore the final eight brick in each of the carrier are unloaded and at right angles to those previously set.

The unloading steps and devices will now be described. Secured adjacent the turn table are a pair of beams 184 and 185 suitably supported on standards 186, 186, 186 and united by cross braces 187 at front and rear and cross straps 188 holding the beams and frames in rigid position. Mounted on the frames 185 and 184 are a pair of journaled bearings 189, 189 at the rear of the frame, relatively to the turn table, in which a rock shaft 190 is fitted;—and a second pair of journaled bearings 191, 191 spaced from the first mentioned bearings a distance equal to the length of eight brick, the second mentioned bearings supporting a rock shaft 192. Secured to the rock shaft 190 are a pair of arms 193, 193, each arm being forked and having pivoted between the forked ends a link 194, extending to and pivotally secured on a cross bar 195 which carries a plurality of brick engaging stops 196 arranged to enter between the flanges 90 on the fingers of each carrier. Similar arms 197, 197 and 198, 198 are fitted to the forward rock shaft 192 carrying a similar crossbar 200 fitted also with stops 196. A pair of inclined guides 201 are fitted on the side frames 184 and 185 just forward of each rock shaft, each being formed to receive a sliding block 203, rigidly secured to the crossbar 195 carrying the stops. Each block has a pair of rollers 204 giving a substantial bearing to hold the crossbar 195 rigidly and consequently to retain the stops 196 in vertical position at all times during the forward and upward movement of the stops as well as when being retracted. A similar arrangement for the forward cross bar 200 is also provided. In order to operate these stops, each rock shaft is extended beyond the bearing on the side of the position of the operator at 106 and is fitted with a crank 206 to which is pivoted an operating rod 207 extending to a lever 208 pivoted to a fulcrum 209 and with a latch 210 engaging a rackbar 211 to hold the stops in either forward or rearward position. The lever 208 for the first or rearward stops on the crossbar 195 has a handle 212 adjacent the handle for the latch and in convenient reach of the operator standing at the position 106. The lever 208 for the forward set of stops has its handle 213 also within convenient and adjacent position.

As best known in Fig. 26, when the carriers have been moved forwardly to the forward limit of their movement for unloading position, the operator then grasps the handle 212 releasing the latch 210 and pulling the same forwardly on the rackbar 211 until the handle engages a notch holding the lever 208 in its forward position. This action through the crank 206 turns the rock shaft 190 and through the arms 193 and links 194, moves the crossbar 195 forwardly and upwardly, the blocks 203 sliding within the inclined guides 201 and thus raising the stops 196 while maintained in their vertical position against the rearmost brick in each column of each carrier, giving an upward and forward pressure thereto. These fingers when in retracted position are sufficiently below the carriers and the brick engaging fingers and flanges so as to permit the latter to freely clear the same, both transversely and forwardly. These fingers also being in fixed alinement with the turn table and the cars, as soon as they engage the pinions in the cars, firmly lock the same, thus giving additional alining means for the apparatus when unloading. These fingers 196 also being all rigidly secured to the crossbar 195 afford a uniformly alined series of stops against which each column of brick in each carrier will be realined if the columns have been carried into and loaded onto the flanges 90 into disalined, open spaced, or other position. Backward movement of each, thus necessarily and accurately brings each column of brick, before it is unloaded or pushed off the open end of the carrier, into exact and even alinement relatively with the fixed unloading stops and the cars on the turn table. All inaccuracies and unevenness therefore in the successive columns of brick in all the eight sets of carriers, twenty four columns in all, will thus be simultaneously and automatically alined by these stops which are rigidly affixed to a permanent frame and in predetermined position with the turn table and the cars. When the first eight brick in each column is thus unloaded, the lever 212 is then moved by the operator to withdraw the rearmost crossbar 195, which is not only moved rearwardly but also downwardly and thus lowering the fingers 196 to inoperative position clear of the carriers and the operator thereupon moves the handle 213 to rock the forward shaft 192 carrying the crossbar 200 with its set of fingers 196, the latter sliding upwardly and into dotted line position, as shown at 215, Fig. 26. The rearmost columns of brick having been moved to the forward position in the carriers by the unloading of the first eight brick in each column during the retraction of the carriers; this is also illustrated in the study sheet, Fig. 9. Meanwhile as already explained, the cars have been lowered and turned ninety degrees so that with the carriers 80 again moved forwardly, the second set of eight brick in each column will be unloaded at right angles or in appropriate hacked relation. This second retraction of the carriers 80 thus finally completes the unloading of all of the columns of brick, again realining the brick in each column and insuring their setting on the previous course of brick. During this retraction of the carriers, it will be appreciated that each brick is held from toppling over or being displaced by the sides of the adjacent fingers, each brick settles downwardly either on the supporting ribs 180 of the car deck or on the previously set course of brick, and being thus lowered into its hacked position squarely and correctly as the carriers are moved backwardly. The lubrication of the bottom surface of the columns of brick facilitates this unloading, as well as the sliding of the rearmost brick in each column forwardly during the unloading of the first set.

The turn table 167 is arranged to rotate on roller bearings, on a supporting frame 220, the frame having a roller raceway 221 and the turn table 167 having a corresponding roller raceway 222, each formed with opposite thrust faces 223, 223 to receive roller bearings 224 with correspondingly beveled faces 225 for said thrust bearings, as clearly shown in Fig. 25. Attached to the turn table 167 is a circular rack 226 and a geared pinion 227 meshes therewith by a worm and gear 228 actuated by a train of gears from a motor 230, which motor is carried on a platform 231 on the support 220. Rotation of the motor thus rotates the platform 167 through ninety degrees, through successive unloading actions in order to build up the courses of brick on the car with each course at right angles to the other. This motor may be arranged to rotate the turn table 167 successively in the same direction or, as herein shown, preferably oscillating the turn table backwardly and forwardly through the ninety degree arc for each successive course. This provision for setting successive courses of brick at right angles is of course optional and if the turn table is not thus rotated, the brick will be piled into "faced relation".

The support 220 is centrally mounted on a shaft 233 which shaft extends downwardly a sufficient distance into a pit 234 through a heavy base casting 235 to which said shaft is held by a key 236 and thus prevented from rotation. This casting has a roller raceway 237 to receive a set of roller bearings 238 and support a rotatable nut 240 having a corresponding roller engaging raceway 239. This nut 240 is threaded to receive the correspondingly threaded lower portion of the shaft 233 so that rotation of the nut 240 will raise and lower the shaft 233 and consequently the turn table and the drier cars supported thereon. I prefer to arrange the rotatable nut 240 to operate between the rollers 238 and a collar 245 above the nut which is held by ribs 246 uniting said collar to a circular flange 247 adapted to rest upon and be secured to the heavy base casting 235. In order to rotate the nut 240 and thus raise and lower the turn table, I provide a worm gear 248 keyed to the nut 240 at 249 and adapted to be turned by a worm 250 operating by a motor 251. The pitch of the threads on the shaft 233 is proportioned so that one rotation of the nut 240 will lower or raise the turn table four inches, the height of one brick. For this purpose a two notch pitch is utilized for the particular dimensions of brick as considered and calculated for in the data forming part of the present disclosure, but it will be appreciated that any other proportioned dimensions can be employed with equal facility.

This process and arrangement of piling or hacking the brick on a car or cars having a deck with projecting ribs and grooves there between, is of special value when it is desired and intended to utilize the type of mechanical setting devices illustrated and explained in my co-pending application, Serial No. 262,947, filed Nov. 18, 1918, and it is contemplated to utilize these mechanical setters in connection with an automatic hacking apparatus illustrated herein. It will however be understood that the automatic hacking of green brick from an off bearing belt can be performed by unloading said brick directly upon any drier car or other device, irrespective of the provision of ribs and grooves, this being especially designed for use in co-operation with my novel and improved type of setters.

The actuation and control of the various motors described will be preferably operated from the station 106 where the operator stands and the starting of the motor 65 to move the hacking machine sidewise will be preferably automatically effected by the reversal of the motors 94, 95, etc. respectively in moving the carriers 80 backwardly. Each of these motors 94, 95, etc. to move the carriers 80 forwardly and backwardly are of the slip ring type and operated from a full reverse drum type controller with secondary resistance and I also preferably provide interlocking contacts for interconnecting each drum with each contactor, one contactor being to move the carriers 80 forwardly and one in reverse direction. Mechanical interlocks are installed between the two contactors and the limit switch 136 arranged to stop the forward end of travel and also the automatic limit switch 144 and brake mechanism to limit the return movement of each carrier will be suitably connected in the circuit. Consequently when the operator throws the drum controller handle for forward direction of the first motor 94 and carrier 80, current will be supplied through the motor and will move the carrier 80 forwardly, picking up the oncoming columns of brick until the proper moment—probably as the fifteenth brick is picked up—, the operator will throw the drum handle into reverse position thereby stopping the motor and the forward travel of the carrier 80 and starting it in reverse direction, meanwhile the time required will be sufficient to pick up the sixteenth brick on each of the three fingers of the carrier. The operator will very quickly become expert in this action and if for any reason he fails to thus reverse the motor, the limit switch 136 will act automatically to stop the forward travel. Simultaneously with the reversion of the rotation of the motor and therefore with the retraction of the carrier 80, the solenoid 44 is de-energized, being connected with the operation of each of the series of motors driving the carriers forwardly and backwardly, allowing the auxiliary belt 30 to drop and the motor 65 is automatically started by the forward moving switch, the solenoid 157 being also actuated to raise the pawl 123 from engagement with its notch and allow the entire hacking apparatus to be moved transversely by the motor 65 which operates at full speed until the limit switch 120 trips over the next adjacent stops 121 and de-energizes the motor 65 and also the solenoid 157, allowing the pawl 133 to engage the next adjacent notch, thus locking the hacking carrier in alinement for the next loading action of the carrier 80. It is also desirable to allow for independent operation of the motor 65, particularly in moving the hacking apparatus to starting position after unloading and means, preferably, a single pole push button are provided for this independent operation of the motor. As the carriers become successively loaded and therefore an increasing weight is to be handled by the motor 65 in moving the partially loaded carrier step by step laterally, I automatically arrange for the cutting out of suitable resistance in the controller with each travel of the hacking apparatus sidewise, thus allowing the motor 65 increased current to still move the increasing load the required distance sideways at substantially equal units of time, viz. two seconds, until the last carrier 80 is loaded, whereupon the motor 65 is operating at full power.

The drum controller also is provided for the motor 115 to move all the carriers 80 forwardly and backwardly during the unloading action. In the operation of the motor also the limit switch 136 will be actuated by one or all of the carriers 80 upon reaching the forward limit of movement and similarly the return limit switch 144 and brake mechanism will be brought into play to stop the travel of all of the carriers 80 and of the motor 115, unless sooner stopped by the operator turning the controller to off position.

In order to rotate the turn table carrying the drier cars and to raise and lower the same, a controller is provided with full reverse automatic self starter, also positioned within convenient reach of the operator at 106. In operating this controll two down switches and one up switch together with suitable accelerating switches and three single push button stations are provided. A limit switch of special revolving type is also utilized for controlling the rotation of the motor 251 and therefore controlling the step by step lowering movements of the turn table four inches with each single revolution of the threaded nut 240. By alternatingly operating one push button for one downward movement and then a second, the turn table and cars are lowered step by step and are maintained interlocked with the circular limit switch permitting only this movement. To reverse the motor 251 and raise the cars, the third push button will be connected to operate the same continuously. Use of such interlocking and automatic electrical controls, in combination with an automatic hacking machine, is distinctly new and I wish to claim the same broadly.

As shown in Fig. 31, each of the motors 94, 95, etc., operating the forward and backward movements of the carrier 80 are connected with and controlled from a drum controller 260 with an operating handle 261 and current reverser 262. Each of these controllers is arranged near the operator at 106, as previously described. Reverse switches for forward and backward movements of the motors 95, 94, etc. are shown at 264 and 263, the forward limit switch 136, back limit switch 144, and solenoid 44 are arranged in circuits substantially as shown, and the circuit wires $L^2$ and $L^3$ extend also to the motor 65 forwardly, interlocking with same through the switch 265 to automatically start this motor sideways actuating the solenoid 157 to release the pawl, current to the motor 65 being automatically disconnected by the limit switch 266; for independent forward and reverse action of the motor, I provide steps 270 for the action and 271 for reversal. Each of the controllers for these motors 94 and 95 are interconnected at the interconnecting points 273 and 274, and each successive actuation of the motor 65 is stopped through decreasing resistance in the controller so as to thereby stop increased power to the motor, thus stepping up the motor proportionately to the increasing load due to the successive loading of the carriers 80 with forty-eight brick each.

The wiring as illustrated in Fig. 31 for the motor 65 is suitable for operating the motor 115 which guides all the carriers 80 forwardly and backwardly during the unloading, said motor 115 being interconnected with a forward limit switch and rearward limit switch 144, but not being wired with a side limit switch 266. I have therefore not shown a separate wiring sheet for the motor 115; as illustrated in Fig. 32, the wiring connections for the motor 230 to raise and lower the turn table 167 are shown. This motor, is provided with two push buttons to actuate the same, two single push button stations 280 and 281 for a single alternative operation to actuate the motor 230 to rotate the threaded nut 240 and lower the turn table four inches, i. e. one complete revolution of the nut 240. Connected in circuit through the line $L^1$ to a semi-circular limit switch 282 which makes and maintains the circuit to the motor 230 during said rotation, this comprising the central portion 283 and a semi-circular branch portion 284 adapted for contact at the station 280 during slightly more than one half rotation, whereupon the switch on this point breaks contact and meanwhile the other semi-circular portion of the limit switch 286 has made contact at 287 and is ready for actuation through the station 281. Thus by alternately actuating the motor 230, first from the station 280 for one lowering action and then from the station 281 for the next lowering action, the turn table is lowered step by step four inches at a time. Meanwhile the turn-table being rotated 90 degrees, as will be explained. When the support and turn table are at extreme lowered position, i. e. when all the courses of brick have been fed off on the drier cars, then the motor 230 is actuated in reverse direction to raise the cars to a level with the tracks for removing by closing the switch at station 288, this being the up switch which is held in contact until the desired level is reached. To break the current automatically to the motor 230, during the down movements, a limit switch is arranged in circuit at 289, and to automatically break the current and stop motor 230 during the reverse of the motor 230 and the upward actuation of the support and turn table, a limit switch 290 is arranged in circuit, as shown. In order to operate the rotation of the motor 230 and therefore to lower the turn table and its support in uniform intervals of time, while compensating for the increasing load of successive layers of brick on the drier cars, I provide accelerating switches which will be energized successively through appropriate relays substantially as shown in Fig. 32, supplying increased current to the motor 230 until it is at full capacity, when being lowered for the last course of brick, to be unloaded onto the drier cars.

In Fig. 33, I have illustrated a controller 295 and the wiring connections for the motor 251 adapted to rotate the turn table 167 successively through 90 degrees as each course of brick is loaded onto the car in order to set or hack these successive layers of brick at right angles to each other. To accomplish this result also, it is necessary to step up the motor, which is done by cutting out resistance during successive rotative movements. While it is advisable to employ a limit switch on this motor so as to turn the turn table continuously in one direction, I prefer to use a simpler method and therefore to simply oscillate the turn table backwardly and forwardly through a circle 90 degrees thereby reversing the motor 251 from time to time. The forward switch 296 and reverse 297 is indicated and also limit switches 298 and 299 respectfully. It may be advisable to provide a solenoid brake on this motor and for this purpose, the wiring is led to a solenoid at 300.

Fig. 34 illustrates the switchboard for the turn table, wherein the switches are indicated as in Fig. 32 to control the downward movements and upward travel of the turn table, these switches controlling the motor 230.

Referring to Fig. 30, I have illustrated a plurality of hacking stations and unloading stations, the first station indicated generally at 301 and the second station indicated at 302 being identical and arranged at any suitable distance apart, the belt 20 conveying the columns of brick from the off bearing belt 9 when the shuttle plate 10 is moved back axially and the columns of brick are prevented from traveling to and upon the auxiliary belt 30, as already explained. I have also illustrated herein a convenient manner of supplying the drier cars to the turn tables 167, 167 at each unloading station, this arrangement however being convenient and practicable and enabling a pair of drier cars to be handled for each hacking apparatus and allowing the loaded cars to be positioned with a minimum of time, distance, travel, and effort and without in the least affecting the hacking apparatus, unloading levers, stops, etc. When two such hacking and unloading stations are utilized, the operations of each are identical excepting that they are arranged in timed relation, whereby one apparatus will be unloading while the other is receiving its load of green brick directly from the off-bearing belt of the machine. Meanwhile a plurality of drier cars can be positioned in line to supply new cars instantly when loaded cars are removed, all being handled without interfering with the tracks of the carrier, or the unloading levers and fused portions of the apparatus.

The operation of my hacking and brick handling apparatus is thus substantially automatic in its various actions, the successive operations either being automatically initiated, maintained, and stopped, or manually controlled and automatically stopped. The forward loading movement of the hacking carriers and fingers to pick off a column or columns of brick from the belt is manually controlled in time, speed, and extent with an automatic limit switch to prevent overtravel, because the travel of the brick is constantly varying and it is desirable to have the movement of the hacking fingers under the control of the operator. The forward speed of travel of these hacking fingers is also under the control of the operator while the rearward speed and travel is automatic, the latter being timed practically with the speed of travel of the belt. This particular method of picking up moving brick directly off a traveling belt by a forward motion which practically halves the time required, because both belt and carrier are moving toward each other while simultaneously gaining time for the retraction of the loaded carrier and the movement of the same out of the way and positioning the second carrier without stopping the continuous travel of the brick and without missing a single brick is of great importance and means are provided for fully carrying out this invention. Furthermore the forward travel of the hacking carriers and brick engaging fingers could be employed to load the carriers, even though the brick were stationary on the auxiliary belt 30 while conversely the carriers could be loaded by the travel of the auxiliary belt if the carriers were stationary. I wish to claim all three of these loading processes in the present application, although in preferred form, I move the belt and carrier toward each other to effect the loading operation. It will be noted that a further advantage of my invention is that, if for any reason the travel of the carrier 80 should be delayed while the belts continue traveling, the brick by the auxiliary belt will simply travel on through the carrier without blocking or causing any damage either to the brick or to the machine, being free to travel entirely through the hacking fingers and will tumble down onto the transfer belt 20. This provision for automatic overflow is of great advantage in actual practice and will be appreciated by those skilled in this art. By providing an overhead hacking apparatus which however engages the brick underneath and without any clamping or marring action whatever, I am able to handle and automatically hack brick with the side faces untouched and perfect. This also is a distinct novelty and of great importance. Even in hand hacking, the fingers of the workman leave permanent prints on the brick and consequently mar the surface. Also the prior efforts to hack brick by side clamps necessarily marred the green and soft brick and invariably the opening of such clamps caused the brick to stick to one side or the other, thus disalining them when being released. My method of carrying the brick into the hacking fingers and then by relatively vertical movement of the belt or hacking fingers simply drop away the belt allowing the brick to rest on the hacking fingers eliminates all danger of marring the same, breaking corners, etc. The same advantage is secured in unloading and the brick are neatly—accurately—and gently unloaded being firmly positioned centrally and squarely and by their own weight only—whereas in hand hacking the operators slam down the brick at varying degrees of pressure and at varying angles, frequently causing the corner or edge of the brick to dig into the lower row, and of course, disaline the same at different courses and heights. The unloading on the drier cars is performed at the same level over all horizontal courses and in a uniform and equal manner throughout. This results in better hacking, more even burning and consequently a larger percentage of perfect brick in each kiln. Furthermore the hacking of brick thus automatically is capable of spacing each row of brick just as desired irrespective of how the brick come off the carriers and from the cutter, the hacking fingers being either closer or wider apart for this purpose and consequently being formed to set the kiln as "tight" or as "free" as may be desired for the best results in burning any particular clay and by any system of kiln burning. This also is of great importance particularly in the modern methods of kiln burning by forced draft. Besides these advantages the hacking is completed with a view to the setting of a kiln, when my improved type of setting apparatus, already referred to, is employed, in spaced or hacked relation for the burning, entirely irrespective of any special spacing for the brick setting machines. In thus hacking the brick in spaced relation, any desired set as "3 over 3," "4 over 3," "4 over 4," etc. In the preferred embodiment of my hacking apparatus as herein illustrated, I have adopted the unit of three carrying fingers which is especially advantageous in affording the usual setting "3 over 3," while, of course, I can employ with equal advantage, the carrying fingers in sets of four or in two, or otherwise.

My apparatus as described and illustrated herein while primarily directed to the automatic handling of green brick, when the brick or clay articles are in a semi-plastic condition and therefore when it is most important not to damage same, can be also advantageously employed in loading, transferring and unloading any similar article or articles. Broadly considered therefore, I believe that my invention constitutes a distinct novelty in the art of automatically transferring a plurality of articles from one support to another—automatically loading the carrier which is utilized for such transfer, automatically picking up the articles from the first support and positioning them on the carrier, automatically maintaining these articles in spaced relation on the carrier during transporting, and automatically unloading the articles in said spaced relation if desired and re-alining the same when unloaded. The special feature of loading the carrier by moving the same in contrary direction to the line of travel of the off-bearing belts is also an important novelty and I believe that this invention by effecting such a relative movement between the carrier and the support is broadly new. The entire loading action could, if desired, be accomplished by the movement of the carrier with the articles on the belt remaining stationary or temporarily stationary and as this feature is of particular importance I wish to claim the same broadly herein.

*Data on loading of hacking machine.*

Figure 3:
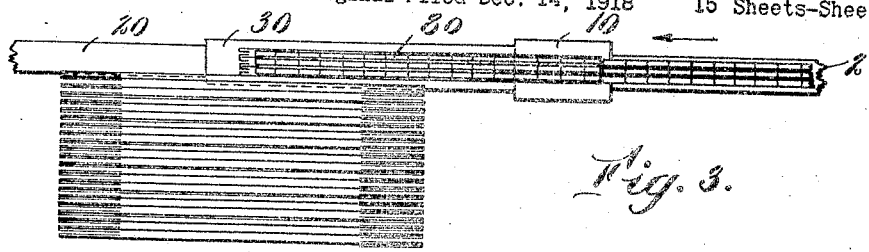
Figure 4:
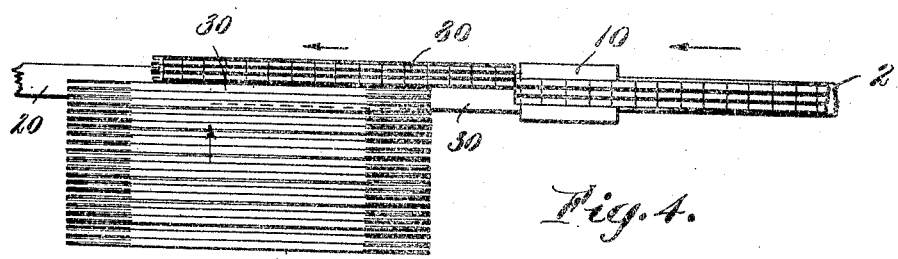
Figure 5:
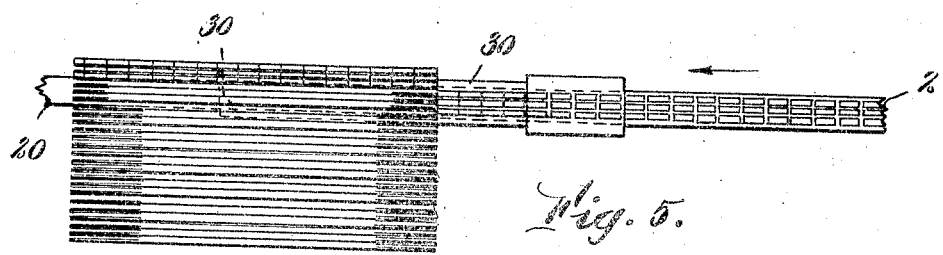
Figure 6:
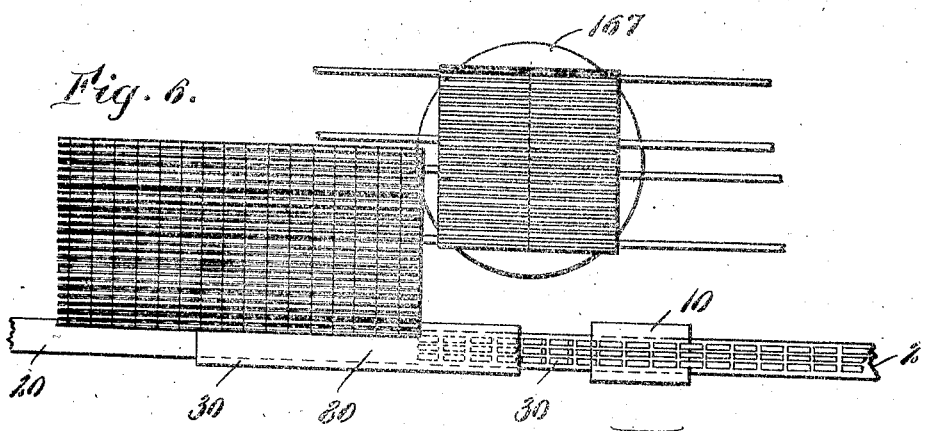
Fig. 6 is a study sheet illustrating the end of the completion of the loading action of eight sets of fingers and the combined side travel respectively, thus picking up 384 bricks and at the end of 32 seconds in time.

| | Seconds. |
|---|---|
| Time of travel of one set of fingers from starting position to extreme forward position (Figs. 1 to 3) | 2 |
| Maximum allowable time for return from extreme forward position to starting position (Fig. 3 to Fig. 5) | 2 |
| Maximum allowable time for side travel of fingers for the space of three bricks (Fig. 3 to Fig. 5) | 2 |
| Time for loading one set of fingers (Fig. 1 to Fig. 5) | 4 |

| | Bricks. |
|---|---|
| Number of bricks on one set of three fingers | 48 |
| Total number of bricks on eight sets of fingers | 384 |

| | Seconds. |
|---|---|
| Total time for loading eight sets of fingers (Fig. 1 to Fig. 6) | 32 |

*Data on unloading of hacking machine.*

Figure 10:
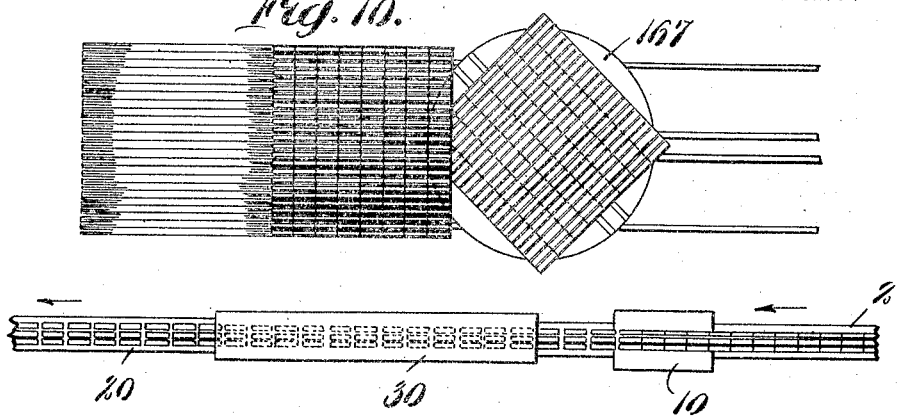
Fig. 10 is a study sheet showing the lowering and turning of the drier cars 90 degrees to deposit the next layer at right angles to the first, said layer requiring two seconds.
Figure 11:
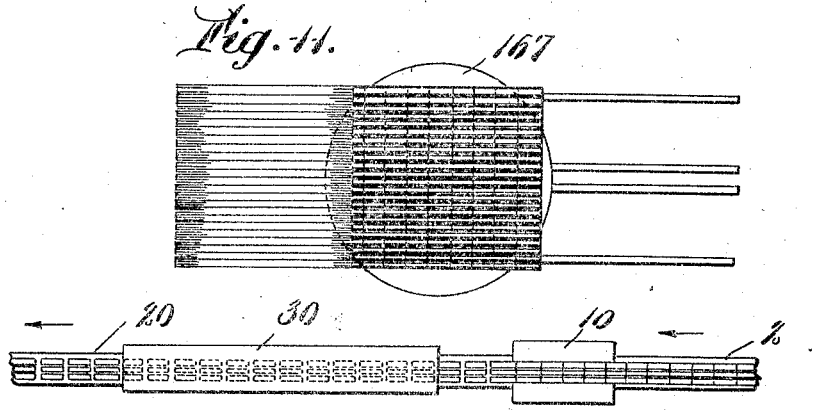
Fig. 11 shows the completion of the partial rotation of the drier cars and the simultaneous moving forwardly of the hacking apparatus to deposit the second layer of brick thereon with a time interval of four seconds.

| | Seconds. |
|---|---|
| Proposed time for moving fingers from loaded position to position in line with dryer cars (Fig. 7 to Fig. 8) | 4 |
| Proposed time for moving fingers forward to position above dryer cars (Fig. 7 to Fig. 8) | 4 |
| Proposed time for depositing first layer of bricks on dryer cars (Fig. 8 to Fig. 9) | 4 |
| Proposed time for lowering dryer cars on brick width (4″) (Fig. 10) | 2 |
| Proposed time for turning dryer cars 90° and moving fingers forward above dryer cars (Fig. 9 to Fig. 11) | 4 |
| Proposed time for depositing second layer of bricks on dryer cars (Fig. 11 to Fig. 12) | 4 |
| Proposed time for returning unloaded fingers from dryer cars to starting position (Fig. 12 to Fig. 1) | 12 |
| Proposed total time for moving hacking machine over to dryer cars, unloading it, and moving it back into starting position for re-loading (Fig. 6 to Fig. 1) | 34 |

*Data on bricks.*

Size of brick 8½″ long, 4″ wide 2¾″ thick.
Weight of one brick 5 lbs. 5¾ oz.

| | Pounds. |
|---|---|
| Weight of 48 bricks | 257 |
| Weight of 384 bricks | 2,058 |

| | Inches. |
|---|---|
| Average space between bricks on belt | 1¼ |
| Average center to center of bricks on belt | 9½ |
| Total length of 16 bricks on belt (spaced) | 152 |
| Total length of 16 bricks in fingers (butted) | 132 |

*Data on capacity of brick machine.*

| | Bricks. |
|---|---|
| Number of bricks per day of 8 hours | 350,000 |
| Number of bricks per hour | 43,750 |
| Number of bricks per minute | 729.16 |
| Number of bricks per second (3 columns) | 12.15 |
| Number of bricks per second per column | 4.05 |

*Data on speed of bricks.*

| | Feet. |
|---|---|
| Travel of belt in feet per minute | 192.35 |
| Travel of belt in feet per second | 3.206 |

| | Inches. |
|---|---|
| Travel of belt in inches per second | 38.47 |

| | Seconds. |
|---|---|
| Time of passing of one brick per column | .25 |
| Time of passing of 16 bricks per column | 4.00 |
| Time of passing of space between bricks | .032 |

*Data of theoretical capacity of hacking machine.*

| | Seconds. |
|---|---|
| Total time for loading hacking machine (Fig. 1 to Fig. 6) | 32 |
| Proposed total time for unloading hacking machine (Fig. 6 to Fig. 1) | 34 |
| Proposed theoretical total time for one complete cycle of loading and unloading hacking machine (Fig. 1 to Fig. 1) | 66 |

| | Bricks. |
|---|---|
| Theoretical capacity of one hacking machine for eight (8) hours | 167,500 |
| Number of bricks passing on belt from time fingers are loaded until they are in position to load again (34 seconds) | 413 |

My present invention is further described and defined in the form of claims as follows:

1. Apparatus for handling articles comprising a movable carrier adapted to be supported from an overhead position and having a plurality of independently movable article engaging portions, means to position said carrier in alinement with a support on which the articles to be moved are placed, means for effecting successive relative movement between the article receiving portions of said carrier and the said support, means to move the carrier successively for said successive loading positions and mechanism for effecting a loading action by a relative substantially vertical movement of the article receiving portion and the support.

2. Apparatus for automatically picking up brick, tile or the like from a moving support comprising a carrier having article receiving means thereon separately movable from the carrier, and mechanism to actuate said article receiving means in a direction opposite to that of the moving support to effect the loading operation.

3. Apparatus for automatically picking up a plurality of columns of brick, tile, or the like from a moving support, comprising a carrier having a plurality of article receiving means thereon independently movable from the carrier and mechanism to actuate said article receiving means in a direction opposite to that of the moving support to effect the loading operation.

4. Apparatus for automatically picking up a plurality of columns of brick, tile, or the like from a moving support, comprising a carrier having a plurality of article receiving means thereon independently movable from the carrier and mechanism to actuate said article receiving means in a direction opposite to that of the moving support to effect the loading operation, including means to move the carrier intermittently during successive loading actuations.

5. Apparatus for lifting a plurality of brick from a moving belt consisting in a carrier adapted to cooperate with said belt to permit a relative vertical movement for transferring the brick from said belt to said carrier including mechanism to move the carrier against the line of travel of the belt and then retracting said carrier at a speed equal to or greater than the travel of the said belt, together with means to move the carrier out of the line of travel of the belt during said retracting movement.

6. Apparatus for automatically handling brick from a continuously moving belt comprising a carrier having a plurality of brick engaging sections each independently movable of the carrier and of each other and adapted for successive alinement with the column of brick to be handled, means for moving said carrier transversely of the line of travel of the brick to bring said sections into successive operating position and means to move each section, when in alinement against the line of travel of the brick to hold the same thereon, together with means for locking the loaded sections into predetermined position on the carrier, and moving the entire carrier to an unloading station.

7. Apparatus for automatically handling brick from a continuously moving belt comprising a carrier having a plurality of brick engaging sections each independently movable of the carrier and of each other and adapted for successive alinement with the column of brick to be handled, means for moving said carrier transversely of the line of travel of the brick to bring said sections into successive operating position and means to move each section, when in alinement against the line of travel of the brick to hold the same thereon, together with means for locking the loaded sections into predetermined position on the carrier, and moving the entire carrier to an unloading station, in combination with unloading devices adapted to cooperate with each section and to remove the brick carried thereby onto a drier car, platform or other support.

8. In brick handling apparatus, the combination, with a carrying device having channels for the reception of bricks in rows, each channel having a bottom portion upon which the bricks may rest and opposed wall portions between which they may be guided, of means for transporting said device from point to point while maintaining the same substantially horizontal, an endless belt conveyor adapted and arranged for delivery of bricks, means for presenting said carrying device to said conveyor with its channels in register with the brick stream so as to receive in ranked formation the bricks delivered thereby, and means for thereafter simultaneously discharging all said rows of bricks endwise out of said channels upon a receiving surface.

9. In brick handling apparatus having in combination a carrier, a plurality or brick engaging devices mounted on said carrier, electric motors adapted to actuate each of said brick engaging devices, means for actuating said motors successively at the will of the operator, means for automatically stopping the motors at a predetermined point in the line of travel of said devices.

10. Brick handling apparatus of the kind described having in combination a carrier, a plurality of brick receiving channels arranged in groups, each group being independently mounted for reciprocating movement on the carrier, an electric motor adapted to control the reciprocations of said plurality of groups of brick receiving devices, an endless belt conveyor adapted to transport bricks in columns, said columns being equal in number to the groups of brick receiving devices and means to successively actuate the motors for each group to engage and lift a predetermined number of brick from said belt.

11. Brick handling apparatus of the kind described having in combination a carrier, means on said carrier to load columns of brick in spaced relation, means to actuate said loading devices successively until all the loading devices of the carrier are filled with bricks and means to unload said devices by the actuation of the entire carrier.

12. Brick handling apparatus of the kind described having in combination a carrier, means on said carrier to load columns of brick in spaced relation, means to actuate said loading devices successively until all the loading devices of the carrier are filled with bricks and means to unload said devices by the cooperation of fixed stop members at a loading station acting to re-aline each row of brick when unloaded.

13. Brick handling apparatus comprising a carrier adapted to receive and transport a plurality of rows of brick in spaced relation, and unloading means for said carrier consisting in movable stops adapted to contact with the brick in the carrier and to move the same endwise from the carrier onto an unloading support by the retractive movement of the carrier.

14. Brick handling apparatus comprising a carrier adapted to transport rows of brick in spaced relation with a plurality of brick in each row and unloading means for said carrier including movable stops adapted to unload a predetermined number of the brick from each row, together with means to unload the remaining brick from each row.

15. Brick handling apparatus comprising a carrier adapted to transport rows of brick in spaced relation with a plurality of brick in each row and unloading means for said carrier including movable stops adapted to unload a predetermined number of the brick from each row, onto an unloading support means to rotate said support 90 degrees and means to unload the succeeding brick a right angles to those first unloaded.

16. Brick handling apparatus comprising a carrier adapted to transport rows of brick in spaced relation with a plurality of brick in each row and unloading means for said carrier including movable stops adapted to unload a predetermined number of the brick from each row onto an unloading support, means to rotate said support 90 degrees, means to effect a relative vertical movement between the carrier and the support to facilitate unloading of the next rows of brick in stacked formation on the unloading support.

17. Brick handling apparatus of the kind described, comprising a carrier, a plurality of movable brick engaging devices on said carrier, motors adapted to move each brick engaging device, limit switches in circuit with said motors and means to control the successive actuations of said motors.

18. Brick handling apparatus of the kind described, comprising a carrier, a plurality of movable brick engaging devices on said carrier, motors adapted to move each brick engaging device, limit switches in circuit with said motors for controlling the stopping of said motors automatically.

19. Brick handling apparatus of the kind described including a carrier, a plurality of brick engaging devices arranged for independent movement transversely of the line of travel of the carrier, a motor adapted to move the carrier intermittently to position successive sets of groups of engaging devices in alinement for receiving brick, and automatic means to stop and hold the carrier at each successive alined position.

20. In brick handling apparatus, the combination with an endless belt for bricks, a carrier comprising a plurality of independently movable sections, means for alining each section with said belt and supporting the same adjacent the upper surface thereof, means for advancing each section while so alined to cause it to become filled with bricks, means for retracting each section when filled and for shifting said carrier laterally to bring the succeeding section into register with said belt, means for shifting said carrier completely out or register with said belt, and means for advancing and retracting all of said sections simultaneous to eject the bricks therefrom.

21. In a brick handling apparatus, a carrier having a plurality of separately movable brick receiving elements, means for moving said elements independently and presenting the same to a brick carrying belt whereby they may become filled with bricks, means for presenting all of said sections simultaneously to a receiving platform, and means for moving all of said sections simultaneously to eject the bricks therefrom upon said platform.

22. In brick handling apparatus, a carrier having a plurality of parallel ways, a longitudinally movable brick carrying element mounted in each of said ways, a rack secured to each element, a shaft traversing all of said racks, a plurality of pinions journaled on said shaft, one meshing with each rack, means for driving said pinions independently, means for rotating said shaft independently of the pinion driving means, and means for clutching all said pinions to said shaft whereby they can be driven simultaneously.

23. In brick handling apparatus, in combination, a carrier having therein a plurality of parallel horizontal ways, means supporting said carrier for movement in a horizontal plane transversely of said ways, brick receiving members supported by said carrier, one for each of said ways and movable therealong, a rack carried by each of said members, plurality of pinions journaled upon said carrier, one meshing with each rack, means for driving said pinions independently, and means for locking all of said pinions together whereby they may be driven simultaneously.

24. In a brick handling apparatus, a brick receiving element comprising a rectangular tubular body of an internal size adapted to receive a brick and having in its bottom face a longitudinal slot of less width than such brick.

25. In brick handling apparatus, a brick receiving element comprising a rectangular tubular body having internal dimensions sufficient in cross section to receive a single brick, the lowermost side of said body having a longitudinal slot therein, of a width less than that of such brick, and supporting means carried by the side of said body at a plurality of points spaced along its length whereby the same is supported in a horizontal position.

26. In brick handling apparatus, the combination with a carrier having a plurality of horizontal guideways, of brick receiving elements located one beneath each guideway, each element comprising one or more rectangular tubes adapted to receive bricks, the lower side of each tube having a longitudinal slot of less width than the bricks, and supporting means mounted in said guideways and attached to the sides of said tubes at spaced portions along the length thereof, whereby said tubes are supported in horizontal position and movable along said guideways.

27. In brick handling apparatus, a brick collecting unit adapted to receive bricks from a carrying belt, said unit comprising a plurality of rectangular tubes, each of said tubes comprising vertical parallel sides, a horizontal top connecting said sides, and a longitudinally slotted bottom, the width of said slot being less than that of a brick.

28. In brick handling apparatus, a brick collecting element comprising an unobstructed rectangular tube adapted to receive the bricks, and having a longitudinal slot throughout its lower wall, the width of said slot being less than that of a brick.

29. In brick handling apparatus, a collecting device adapted to receive bricks from an endless belt, said device comprising vertical webs spaced apart a distance greater than the width of a brick and having at their lower edges lateral flanges adapted to underlie the edge of a brick and spaced apart a distance less than the width of such brick and forming a tube, said tube being unobstructed from end to end thereof, and means for presenting said tube to said belt in receiving relation in alinement with the bricks thereon.

30. In brick handling apparatus, in combination a carrier supported for movement in one direction in a horizontal plane, a plurality of brick collecting units on said carrier and movable in a horizontal plane in a direction perpendicular to the carrier movement, means for advancing and retracting said sections independently of each other, and means operative during the retraction of each section for moving said carrier laterally the width of one section.

31. In brick handling apparatus, in combination a carrier supported for movement in one direction in a horizontal plane a plurality of sets of brick collecting elements supported by said carrier and movable in a horizontal plane in a direction perpendicular to that of the carrier movement, means for advancing and retracting said elements independently, means for advancing and retracting all of said elements simultaneously, and means for moving all of said sets sideways simultaneously.

32. In brick handling apparatus, in combination, an endless conveying belt having a plurality of raised portions thereon, each of said portions having a width less than that of a brick, in combination with a collecting member having vertical webs spaced apart a distance greater than the width of the brick, the lower edges of said webs having flanges projecting towards each other and defining a slot whose width is greater than that of said strip and less than that of the brick thereon, and means for presenting said collecting member to said belt in such wise that said raised portion will project into said slot.

33. In brick handling apparatus, in combination, an endless conveying belt having longitudinally disposed raised portions on its upper surface, a tubular collecting member supported above said belt and having in its lower wall a longitudinal slot through which said raised portion extends, said tube being wider and said slot being narrower than the width of a brick, and means for alternately presenting said tube to said belt whereby it may become filled with bricks, and withdrawing it therefrom together with the bricks it contains.

34. In brick handling apparatus, in combination, an endless conveying belt having on its upper surface a longitudinally narrow raised portion, a carrier supported above said belt and movable transversely thereon in a horizontal plane, said carrier comprising a plurality of rectangular tubes each having in its lower face a slot adapted to receive said narrow raised portion, the tube being wider and the slot being narrower than the width of a brick, means for moving said carrier transversely of said belt as its tubes become filled with bricks, and means operative simultaneously with such transverse movement for producing a relative vertical movement between said carrier and belt to release said narrow raised portions from said slots.

35. In brick handling apparatus, in combination, an endless conveying belt having upon its upper surface one or more narrow longitudinal strips, a carrier comprising a plurality of rectangular receiving channels each of a width sufficient to receive a brick and having in its bottom wall a longitudinal slot of a width to receive one of said strips, means for moving said carrier transversely past said belt in a step-by-step manner, and means operative upon the beginning of movement for lowering said belt and upon cessation of such movement for raising said belt relatively to said carrier.

36. In brick handling apparatus, in combination, an endless belt for bricks, a carrying device having a receiving part lying close to the upper surface of said belt, said carrying device being movable both longitudinally of said belt and laterally thereof, means for advancing said carrying device relatively to the movement of said belt and simultaneously guiding into said device the bricks thereon, means for stopping the forward movement of said carrier and simultaneously lowering said belt relatively thereto, means for retracting said carrier, and means operative simultaneously with said retraction for shifting said carrier laterally past said belt.

37. In brick handling apparatus, in combination, a vertically movable frame, a conveying belt mounted upon said frame, rails located above said frame transversely of said belt, a brick carrier supported upon said rails and movable therealong, means for presenting said carrier to said belt in operative relation to receive the bricks carried thereby, means for shifting said carrier laterally as the different portions of the same become filled with the bricks, and means operative simultaneously with such lateral shifting for lowering said frame and thereby moving said belt out of operative relation with said carriage.

38. In brick handling apparatus, the combination with an off-bearing belt, of an endless auxiliary belt spaced therefrom, a carrier located in operative relation to said auxiliary belt, a by-pass conveyor, means for directing bricks delivered by said off-bearing belt either to said auxiliary belt or to said by-pass conveyor, means for presenting successive portions of said carrier to said auxiliary belt until the same becomes completely filled with bricks, and mechanism actuated simultaneously with the completion of loading of said carrier for operating said means for diverting said bricks from said auxiliary belt to said by-pass conveyor.

39. In brick handling apparatus, in combination with an off-bearing belt of a shuttle plate overlying the same at its discharge end and adapted to receive the bricks therefrom, an auxiliary conveyor spaced from said off-bearing belt and adapted to receive bricks from said shuttle plate, a second conveying means beneath said shuttle plate, and means for moving said shuttle plate to uncover said second conveying device, and for moving said shuttle plate to deliver bricks to either the first or the second of the conveying devices.

40. In brick handling apparatus, in combination, an off-bearing belt for bricks, a conveying device spaced from the end of said belt and substantially in alinement therewith, a second conveying device below said first conveying device, and a shuttle plate overlying the upper surface of said off-bearing belt and adapted either to bridge the opening between said belt and said first conveying device or to be moved over said belt so as to disclose said second conveying device.

41. In brick handling apparatus, in combination, a device for delivering bricks in succession, a carrying device having spaced parallel channels, each channel having a bottom portion upon which the bricks can rest and be supported, means for presenting said carrying device to said delivering device in receiving relation with its channels in register with said device, means for causing relative intermittent movement between said devices whereby said channels may be filled successively with bricks arranged in ranked relation, and means for thereafter removing said carrying device bodily from said delivering device.

42. In brick handling apparatus, in combination, a device for delivering bricks in succession, a carrying device having spaced parallel channels, each channel having bottom portions upon which the bricks can rest and be supported, means for relatively presenting said carrying device to said delivery device in receiving relation with its channels in register with said device, means for causing relative intermittent vertical movement between said devices whereby said channels may be filled successively with bricks arranged in ranked relation, and means for thereafter removing said carrying device bodily from said delivering device.

In testimony whereof, I have signed my name to this specification.

GRAFTON E. LUCE.